(12) United States Patent
Smith et al.

(10) Patent No.: US 8,885,018 B2
(45) Date of Patent: Nov. 11, 2014

(54) DISPLAY DEVICE CONFIGURED TO SIMULTANEOUSLY EXHIBIT MULTIPLE DISPLAY MODES

(75) Inventors: Nathan James Smith, Oxford (GB); Benjamin John Broughton, Oxford (GB); Lesley Anne Parry-Jones, Oxford (GB); Jonathan Mather, Oxford (GB); Harry Garth Walton, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 558 days.

(21) Appl. No.: 12/867,084

(22) PCT Filed: Feb. 20, 2009

(86) PCT No.: PCT/JP2009/053621
§ 371 (c)(1),
(2), (4) Date: Aug. 11, 2010

(87) PCT Pub. No.: WO2009/104818
PCT Pub. Date: Aug. 27, 2009

(65) Prior Publication Data
US 2010/0309204 A1    Dec. 9, 2010

(30) Foreign Application Priority Data
Feb. 21, 2008 (GB) .................. 0803170.0

(51) Int. Cl.
*H04N 13/00* (2006.01)
*G02B 27/22* (2006.01)
*H04N 13/04* (2006.01)

(52) U.S. Cl.
CPC ........ *H04N 13/0404* (2013.01); *G02B 27/2214* (2013.01); *H04N 13/0447* (2013.01); *H04N 13/0454* (2013.01); *H04N 13/0409* (2013.01)
USPC .............. 348/42; 348/51; 345/32; 359/462; 359/463

(58) Field of Classification Search
None
See application file for complete search history.

(56) References Cited

U.S. PATENT DOCUMENTS 5,825,436 A  10/1998 Knight
5,831,698 A  11/1998 Depp et al.
(Continued)

FOREIGN PATENT DOCUMENTS

GB     2 405 542 A    3/2005
GB     2 413 394 A    10/2005
(Continued)

OTHER PUBLICATIONS

International Search Report for corresponding International Application No. PCT/JP2009/053621 dated Jun. 9, 2009.
(Continued)

*Primary Examiner* — Nhon Diep
*Assistant Examiner* — Kaitlin A Retallick
(74) *Attorney, Agent, or Firm* — Renner, Otto, Boisselle & Sklar, LLP

(57) ABSTRACT

A display comprises a parallax optic (2), such as a combined parallax barrier and lens array, and a pixellated display device (1). The pixels of the display device (1) are arranged as groups cooperating with a parallax element (4) of the parallax optic (2). Each group comprises a first pixel (A) aligned with the centre of the parallax element (4), second and third pixels (B, C) on either side of the first pixel (A), and fourth pixels (D) shared with adjacent groups and disposed outside the second pixels (B, C). The parallax elements (4) make the different pixels of each group visible in different viewing regions. A control arrangement selects regions of the display and selects different combinations of the pixels of each group for image display within respective regions so as to provide simultaneously-present different viewing modes having different viewing range characteristics.

36 Claims, 35 Drawing Sheets

(56) References Cited

U.S. PATENT DOCUMENTS

| | | |
|---|---|---|
| 5,844,640 A | 12/1998 | Adachi |
| 5,877,829 A | 3/1999 | Okamoto et al. |
| 5,945,965 A | 8/1999 | Inoguchi et al. |
| 6,023,277 A * | 2/2000 | Osaka et al. ............... 345/419 |
| 6,137,456 A | 10/2000 | Bhagavatula et al. |
| 6,211,930 B1 | 4/2001 | Sautter et al. |
| 6,421,033 B1 | 7/2002 | Williams et al. |
| 6,646,707 B2 | 11/2003 | Noh et al. |
| 6,809,470 B2 | 10/2004 | Morley et al. |
| 6,935,914 B2 | 8/2005 | Ito et al. |
| 7,091,652 B2 | 8/2006 | Morley et al. |
| 2001/0015782 A1 | 8/2001 | Takato et al. |
| 2002/0180922 A1 | 12/2002 | Takato et al. |
| 2004/0100604 A1 | 5/2004 | Takato et al. |
| 2004/0207594 A1 | 10/2004 | Kubo |
| 2004/0207664 A1* | 10/2004 | Anderson ............... 345/851 |
| 2004/0239231 A1 | 12/2004 | Miyagawa et al. |
| 2005/0111100 A1* | 5/2005 | Mather et al. ............ 359/464 |
| 2006/0109224 A1 | 5/2006 | Chang et al. |
| 2006/0139448 A1* | 6/2006 | Ha et al. ............... 348/51 |
| 2006/0139751 A1 | 6/2006 | Cha et al. |
| 2006/0158729 A1* | 7/2006 | Vissenberg et al. ....... 359/462 |
| 2006/0267905 A1 | 11/2006 | Nishino et al. |
| 2006/0279528 A1* | 12/2006 | Schobben et al. ......... 345/156 |
| 2007/0008456 A1* | 1/2007 | Lesage et al. ............ 349/62 |
| 2007/0013624 A1* | 1/2007 | Bourhill ............... 345/84 |
| 2007/0040975 A1 | 2/2007 | Momoi |
| 2007/0046881 A1 | 3/2007 | Takei |
| 2007/0081208 A1 | 4/2007 | Chang et al. |
| 2007/0121047 A1 | 5/2007 | Chung et al. |
| 2007/0146236 A1 | 6/2007 | Kerofsky et al. |
| 2007/0183015 A1 | 8/2007 | Jacobs et al. |
| 2007/0291172 A1* | 12/2007 | Kouzimoto et al. ....... 348/488 |
| 2009/0002268 A1 | 1/2009 | Ueta et al. |
| 2010/0295755 A1* | 11/2010 | Broughton et al. ........ 345/32 |
| 2011/0018860 A1* | 1/2011 | Parry-Jones et al. ...... 345/214 |
| 2011/0126159 A1* | 5/2011 | Ko et al. ............... 715/848 |

FOREIGN PATENT DOCUMENTS

| | | | |
|---|---|---|---|
| GB | 2 426 352 A | 11/2006 | |
| GB | 2 427 033 A | 12/2006 | |
| GB | 2 428 101 A | 1/2007 | |
| GB | 2 428 152 A | 1/2007 | |
| GB | 2 439 961 A | 1/2008 | |
| GB | 2 445 982 A | 7/2008 | |
| GB | 2 455 061 A | 6/2009 | |
| JP | 9-73049 A | 3/1997 | |
| JP | 9-230377 | 9/1997 | |
| JP | 10-232665 A | 9/1998 | |
| JP | 11-030783 A | 2/1999 | |
| JP | 11-205822 A | 7/1999 | |
| JP | 11-331876 A | 11/1999 | |
| JP | 2002-299039 A | 10/2002 | |
| JP | 3607272 | 10/2004 | |
| JP | 3607286 | 10/2004 | |
| JP | 2005-316790 A | 11/2005 | |
| JP | 2005316790 A * | 11/2005 | ............ G06F 3/00 |
| JP | 2006-184859 A | 7/2006 | |
| JP | 2006-189833 A | 7/2006 | |
| JP | 2006-201319 A | 8/2006 | |
| JP | 2006-236655 A | 9/2006 | |
| JP | 2006-293878 A | 10/2006 | |
| JP | 2007-110731 A | 4/2007 | |
| JP | 2007-228390 A | 9/2007 | |
| JP | 2007-318184 A | 12/2007 | |
| WO | 01/33598 A1 | 5/2001 | |
| WO | 03/007663 A1 | 1/2003 | |
| WO | 2004/040354 A1 | 5/2004 | |
| WO | 2004/070451 A1 | 8/2004 | |
| WO | 2005/045488 A1 | 5/2005 | |
| WO | 2006/033046 A1 | 3/2006 | |
| WO | 2007/007285 A2 | 1/2007 | |

OTHER PUBLICATIONS

Written Opinion for corresponding International Application No. PCT/JP2009/053621 dated Jun. 9, 2009.

Search Report for corresponding British Application No. GB 0803170.0 dated Jun. 11, 2008.

* cited by examiner (a)        (b)

| R | G | B | R | G |
|---|---|---|---|---|
| R | G | B | R | G |
| R | G | B | R | G |
| R | G | B | R | G |
| R | G | B | R | G |

FIG. 13b

| R | G | B | R | G |
|---|---|---|---|---|
| G | B | R | G | B |
| B | R | G | B | R |
| R | G | B | R | G |
| G | B | R | G | B |

FIG. 13c

| R | G | B | W | R |
|---|---|---|---|---|
| B | W | R | G | B |
| R | G | B | W | R |
| B | W | R | G | B |
| R | G | B | W | R |

FIG. 13d

|   | R | G | B | R |   |
|---|---|---|---|---|---|
| R | G | B | R | G |   |
|   | R | G | B | R |   |
| R | G | B | R | G |   |
|   | G | B | R | G |   |

(a)

(b)

DISPLAY DEVICE CONFIGURED TO SIMULTANEOUSLY EXHIBIT MULTIPLE DISPLAY MODES

TECHNICAL FIELD

The present invention relates to a display. Such a display may be used as a directional display in, for example, a mobile phone, a laptop personal computer, a television, a desktop monitor etc. Such a display device may be capable of multiple image display functions, for example, a conventional display, a privacy display, an autostereoscopic 3D display.

BACKGROUND ART

Multiple users can view the same image on a conventional display device simultaneously. The properties of a conventional display device are such that viewers can see the same image from different angles with respect to the display (hereafter "Public Mode"). This is effective in applications where many users require the same information from the display—such as, for example, displays of departure information at airports and railway stations. However, there are many applications where it would be desirable for an individual user or multiple users to be able to see angular dependent information from the same display. Example 1—"Dual View": it would be desirable for a single display located on the dashboard of a motorcar to relay satellite navigation data to the driver while a passenger views a film. Example 2—"Privacy": a single display user who wishes to view confidential material in a public place and would therefore find it desirable to display the confidential image on-axis only (i.e. for the user's eyes only) and to display a non-confidential image off-axis that could be viewed by $3^{rd}$ parties. Example 3—"3D Function": in order to view a 3D image (an image with perceived depth) from a display, a single user requires different images (a "stereoscopic pair") to be directed to each eye.

GB2405542 describes the use of a parallax optic and a display for creating a directional display. Embodiments within GB2405542 concentrate on realising a Dual View display whereby two independent images are viewable in two different principal directions. The application for in-car use is emphasised and accordingly one image is viewable to the left of the display's normal axis while the second image is viewable to the right of the display's normal axis. By directing the same image to both the left and right views, a normal "public" mode is realised. The main disadvantage of the public mode is that images have only 50% resolution and approximately 50% brightness compared to an identical image panel without the parallax optic attached. This relatively poor public mode performance limits the application of the display mode to relatively niche markets. GB2405542 also mentions that a switchable privacy display may also be realised that enables a public wide view mode and a private narrow view mode. However, GB2405542 does not teach explicitly how to realise a privacy display nor does it describe how to electronically switch between the public wide view mode and a private narrow view mode of said privacy display.

On Sep. 27, 2006, Sharp announced a "Triple View Directional Viewing LCD" (hereafter "Triple View Display") which offers simultaneous display of three independent images by combining an existing liquid crystal device (LCD) with a parallax optic, as illustrated in FIG. 1 of the accompanying drawings. The display 9x comprises a display device 9b and a parallax optic 2 formed on a substrate 7 and displays the three views such that they are viewable in viewing regions 28. This LCD is capable of the following image functions: a public wide view mode and a Triple View mode. In the Triple View mode, three independent images are displayed that are viewable from different directions, such that one image is viewable substantially on-axis by a viewer 5 while another image is viewable substantially off-axis to the left of the display by a viewer 5b while another image is viewable substantially off-axis to the right of the display by the viewer 5c. The Triple View mode also serves as a privacy mode since an on-axis user 5 can view content that cannot be viewed off-axis. By directing the same image to the left to viewer 5b, centre to viewer 5 and right to viewer 5c, a normal public mode is realised on the Triple View Display. The main disadvantage of the public mode is that images have only 33% resolution and approximately 33% brightness compared to an identical image panel without the parallax optic attached. This relatively poor public mode performance limits the application of the display mode to relatively niche markets. GB2426352 describes a display that can yield a public wide view mode, a private narrow view mode and an autostereoscopic 3D mode. U.S. Ser. No. 11/348,602 describes a display that can yield a public wide view mode, a private narrow view mode, a Dual View mode and an autostereoscopic 3D mode. The main disadvantage of both GB2426352 and U.S. Pat. No. 11/348,602 is that, in order to realise a display with extra image functions, an additional liquid crystal switch cell is required. The extra liquid crystal switch cell increases the relative thickness and weight of the whole display module by approximately 40%. The extra weight and thickness are very undesirable, especially for mobile display products such as mobile phones, laptop personal computers etc. Methods of changing the viewing angle properties of a display panel using additional liquid crystal cells are also described in GB2413394; GB2427033, GB2439961, JP09230377 JP3607272, JP3607286, U.S. Pat. No. 5,825,436 and WO04070451.

A number of technologies exist which describe ways of creating switchable privacy by exploiting the natural viewing angle dependence of liquid crystal displays and include JP09230377, U.S. Pat. No. 5,844,640, US20070040975A1, US20070121047A1, US20060109224, US20040207594 and GB2428152A1, JP1999-11-30783, U.S. Pat. No. 6,646,707, JP 1999-11-30783, US20060267905A1, US20070046881, GB2428101, GB patent application no. 0721255.8. Although all of these methods are advantageous in terms of adding no extra thickness or weight to the existing display panel, they are specific to the use of a liquid crystal display (LCD) mode, and could not (for example) be used to make a switchable privacy organic light emitting diode (OLED) display. U.S. Pat. No. 5,844,640, US20070040975 and US20070121047 disclose techniques for changing the viewing angle properties of a single layer LCD panel. This is achieved for a vertically aligned nematic (VAN) LC mode. These techniques are such that parallax optics are unnecessary. Related prior art in the use of lenses and parallax optics for creating non-switchable privacy displays include: JP2002299039, JP2006236655, U.S. Pat. Nos. 6,809,470, 7,091,652, 6,935,914, WO0133598, WO03007663. A display that does not have the capability of switching between a public wide view mode and a private narrow view mode has an inherent disadvantage over displays that are switchable between the two modes.

A method for switching from public to private mode with no moving parts is to mount a light control film behind the display panel, and to place a diffuser which can be electronically switched on and off between the light control film and the panel. When the diffuser is inactive, the light control film restricts the range of viewing angles and the display is in private mode. When the diffuser is switched on, it causes light travelling at a wide range of angles to pass through the panel and the display is in public mode. It is also possible to mount the light control film in front of the panel and place the switchable diffuser in front of the light control film to achieve the same effect. Switchable privacy devices of these types are described in U.S. Pat. Nos. 5,831,698, 6,211,930 and 5,877, 829. They share the disadvantage that the light control film always absorbs a significant fraction of the light incident upon it, whether the display is in public or private mode. The display is therefore inefficient in its use of light. Since the diffuser spreads light through a wide range of angles in the public mode, these displays are also dimmer in public than in private mode, unless the backlight is made brighter to compensate.

An addressing scheme for application to LED and OLED displays is described in U.S. Pat. No. 6,421,033 whereby the use of multiple counter electrodes controls the effective resolution enhancement to an active matrix display without increasing the total number of thin film transistors (TFTs). However, U.S. Pat. No. 6,421,033 does not propose to use the multiple counter electrodes in order to yield a multiple image function display.

DISCLOSURE OF THE INVENTION

According to a first aspect of the invention, there is provided a display comprising: a parallax optic having a plurality of parallax elements; a display device having a plurality of pixels arranged as groups, each of which cooperates with a respective one of the parallax elements of the parallax optic such that corresponding pixels of the groups are viewable in respective different viewing regions; and a control arrangement capable of selecting arbitrary first and second regions of the display device and capable of simultaneously selecting, for image display, a first combination of the pixels of each group of the first region and a second combination of the pixels, different from the first combination, of each group of the second region to provide simultaneous first and second display viewing modes of different viewing range characteristics.

The control arrangement may be capable of selecting at least one further arbitrary region of the display device and of selecting, for image display, at least one further combination of pixels, different from the first and second combinations, of each group of the at least one further region to provide at least one further simultaneous viewing mode of viewing range characteristics different from those of the first and second modes. The at least one further region may comprise a single third region. As an alternative, the at least one further region may comprise a plurality of further regions.

The first mode may be a public mode.

Adjacent ones of the viewing regions may partially overlap.

The parallax optic may be non-controllable.

Selection of display mode may be determined exclusively by pixel selection of each group.

Each of the modes may be selected from at least some of: a first private mode whose viewing region includes a display axis; a second private mode whose viewing region is offset from the display axis; a public mode; a first dual view mode whose viewing regions are on either side of the display axis; a second dual view mode whose viewing regions are on one side of the display axis; and an autostereoscopic mode.

At least one of the modes may comprise the autostereoscopic mode and the display may comprise an image generator for generating a three-dimensional image of a user-operable control device for display by the display device and an input device for detecting a user operation, the image generator being arranged, in response to detection by the input device of the user operation, to change the perceived depth position of the control device image. The control device may be a control button. The image generator may be arranged to change the perceived depth plane of an upper surface of the control button image in response to detection by the input device. The input device may comprise one of a mouse, a touchscreen, a gesture recognition device and a proximity detector.

Each parallax element may provide two-dimensional parallax.

Each parallax element may provide one dimensional parallax. Each group may comprise a first pixel aligned with the centre of the cooperating parallax element, second and third pixels on opposite sides of the first pixel, and at least one fourth pixel on the opposite side of the second or third pixel from the first pixel. The at least one fourth pixel may be shared with an adjacent group.

Each group may comprise first and second pixels, disposed on opposite sides of a plane containing a centre line of the cooperating parallax element and extending substantially perpendicularly to the parallax optic, and third pixels disposed on opposite sides of the first and second pixels from the plane. At least one of the third pixels may be shared with an adjacent group.

Each group may comprise first and second pixels, disposed on opposite sides of a plane containing a centre line of the cooperating parallax element and extending substantially perpendicularly to the parallax optic, and third and fourth pixels disposed on opposite sides of the first and second pixels, respectively, from the plane.

The pixels of each group may be of a same colour.

The parallax optic may comprise a one dimensional array of parallax elements. As an alternative, the parallax optic may comprise a two dimensional array of parallax elements.

The parallax optic may comprise a lens array. As an alternative, the parallax optic may comprise a parallax barrier. Each parallax element may comprise an aperture containing a lens.

The parallax optic may be formed on a substrate of the display device. As an alternative, the parallax optic may be attached to a substrate of the display device.

The parallax optic may be disposed between outer elements of the display device.

The display device may be one of a transmissive device, a reflective device and a transflective device. The display device may be a liquid crystal device.

The display device may be an emissive device. The display device may be one of a light emitting diode device, an organic light emitting diode device, a plasma display device, a field emission device and a cathode ray tube.

The parallax optic may be disposed between the display device and the viewing regions.

The display may comprise a manual input arrangement cooperating with the display device to permit manual selection of viewing mode. The manual input arrangement may comprise a touch screen arrangement.

According to a second aspect of the invention, there is provided a display comprising a parallax optic and a display device having a plurality of pixels arranged as groups, each of which cooperates with a parallax element of the parallax optic and comprises a first pixel aligned with the parallax element, second and third pixels on opposite sides of the first pixel, and at least one fourth pixel on an opposite side of the second or third pixel from the first pixel.

According to a third aspect of the invention, there is provided an interactive three-dimensional display comprising a display device, an image generator for generating a three-dimensional image of a user-operable control device for display by the display device, and an input device for detecting a user operation, the image generator being arranged, in response to detection by the input device of the user operation, to change the perceived depth position of the control device image.

The display device may be an autostereoscopic display device.

The control device may be a control button. The image generator may be arranged to change the perceived depth plane of an upper surface of the control button image in response to detection by the input device.

The input device may comprise one of a mouse, a touch screen, a gesture recognition device and a proximity detector.

It is thus possible to provide a display which is capable of simultaneously providing different viewing modes having different angular viewing characteristics. The different modes may be provided anywhere on the display, which provides total flexibility in configuring the display for the desired operation. The regions can be selected entirely arbitrarily because the mode is selected by selecting which pixels of each group are active. Thus, all of the groups of pixels provide the same viewing region capabilities. If desired, the whole of the display may be operated in a single mode and this may be chosen from any of the modes which are available in a particular embodiment. However, the display has the capability of providing any of the viewing modes from the available ones in any arbitrary region of the display and simultaneously providing any of the other available modes in any other arbitrary region of the display.

In a typical embodiment, the parallax optic combined with the pixellated image display creates angularly dependent viewing zones for the image display's pixels. Via suitable addressing of data to the image display's pixels, at least four distinct image display functions can be realised. These image display functions include, but are not limited to, a Public Mode, a Private Mode, a Dual View Mode and an Autostereoscopic 3D Mode. In the Public Mode, the displayed image is viewable from all directions. In the Private Mode, at least two independent images are displayed that are viewable from different directions, such that one image is viewable substantially on-axis while the other image is viewable substantially off-axis. In the Dual View mode, at least two independent images are displayed, such that one image is viewable substantially off-axis to the left of the display while the other image is viewable substantially off-axis to the right of the display. In the Autostereoscopic 3D mode (hereafter 3D mode), an image is displayed that is perceived to have depth; thus a three dimensional image is also realised.

The pixellated image display device may comprise, but is not limited to, a Liquid Crystal Display (LCD) or a Organic Light Emitting Diode (OLED) display or a Plasma Display Panel (PDP) or an Electrophoretic display or an Electrowetting display or a Field Emission Display (FED), or a Surface-conduction Electron-emitter Display (SED) or a light emitting diode LED display or a plasma display (PDP) or a Field Emission Display (FED) etc.

The pixellated image display may be, but is not limited to, a transmissive display or an emissive display or a reflective display or a transflective display.

The configured layout of the pixels on the image panel is not important. Consequently the pixellated image display may be, but is not limited to, a one dimensional array of pixel colours or a 2 dimensional array of colours or pixels arranged in a Pentile RGBW™ configuration.

The parallax optic may be a parallax barrier that is comprised of transmissive and non-transmissive regions. The parallax optic may be comprised of a lens array. The parallax optic may be comprised of a parallax barrier and lens array. The parallax optic may be periodic in one dimension. The parallax optic may be periodic in two dimensions. The lens elements may focus light into a plane (cylindrical lenses) or to a point (spherical lenses).

The parallax optic may be fabricated on a substrate that is subsequently attached to the image display device. The parallax optic may be formed directly on an image panel's substrate that is closest to the viewer. The parallax optic may be formed between the substrates that form the image panel.

The pitch of the structure on the parallax optic may be chosen to enable even viewing of images across the extent of the image panel display for a user situated about the central axis of the display.

The pitch of the parallax optic may be substantially equal to the pitch of four pixels. The parallax optic creates angular dependant viewing zones for each pixel. A first pixel may be substantially viewable on-axis of the image display. A second pixel may be partially viewable on-axis and partially viewable off-axis to the right of the image display. A third pixel may be partially viewable on-axis and partially viewable off-axis to the left of the image display. A fourth pixel may be substantially viewable off-axis of the image display.

The parallax optic and method of addressing images to the pixellated image display device may be used in conjunction with any type of pixellated information display, for example, a liquid crystal display (LCD) or an organic light emitting diode display (OLED) or a plasma display or a Field Emission Display (FED) or an electrophoretic display etc. Such techniques are also compatible with pixellated display types that are transmissive, emissive, reflective and transflective. Such universal applicability to any type of pixellated information display has commercial advantage since development of just one technology enables multiple image functionality to be applied to any pixellated information display.

The parallax optic may be the only physical element added to an information display. The parallax optic is relatively thin (<500 μm) and consequently does not add appreciable thickness or weight to the image display. In order to realise the multiple image functions for the display, sometimes it is necessary to reduce the thickness of a substrate in the image display so that the parallax optic can be placed in close proximity to the image display's pixels. Consequently, the overall thickness and weight of the display, comprising image display device plus parallax optic, is about the same as the original, unmodified image display panel. This feature is a particularly important advantage for mobile display products, such as mobile phones, laptop computers etc. where thickness and weight are important metrics.

Once the parallax optic is correctly secured to the image display, all of the multiple image functions can be activated via the method of image addressing. Consequently, switching between the multiple image functions is cheap, reliable and fast. The method of image addressing is also very simple and therefore requires very little computation power. An image function, such as privacy for example, can be activated very quickly. In general, the activation time for any of the image display functions will be closely linked to the display's refresh time, which is typically faster than 100 ms and can, for some displays, be as faster than 1 ms.

A further advantage is that, by designing the parallax optics appropriately, privacy in both the horizontal, vertical and diagonal directions (360°) can be achieved. A further advantage is that the privacy option can be activated while using either the Dual View mode or the 3D mode.

A further advantage is that multiple privacy strength options may be provided. Consequently the user can choose the privacy strength and privacy direction to suit their requirements and environment. For example, the user may select "standard" image privacy strength to the user's left but no image privacy to the user's right. In another example, the user may select "strong" image privacy strength to the user's left and no image privacy to the user's right. The versatility of the Privacy Mode enables the user to maximise the on-axis brightness and resolution of the image display while maintaining a desired level of image privacy.

A further advantage is that the multiple image functions for the display may be activated simultaneously at different spatial locations on the display's surface. Thus, a display can be realised whereby part of the display is concealing confidential information (such as a password or picture), another part of the display is showing 3D content and another part of the display is showing Dual View content. In general, any spatial location of the display may provide any of the aforementioned image functions.

The Public Mode performance, in terms of brightness and resolution, may be significantly better than other directional displays offering multiple image display functions. Since the Public Mode may be active for the majority of the time, advantageous performance of the Public Mode is of paramount importance. The on-axis resolution of Sharp's Triple View Display is one third of the native image display whereas the on-axis resolution of typical embodiments of the invention is three quarters of the native image display.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

Figures 13A, 13B, 13C, 13D:
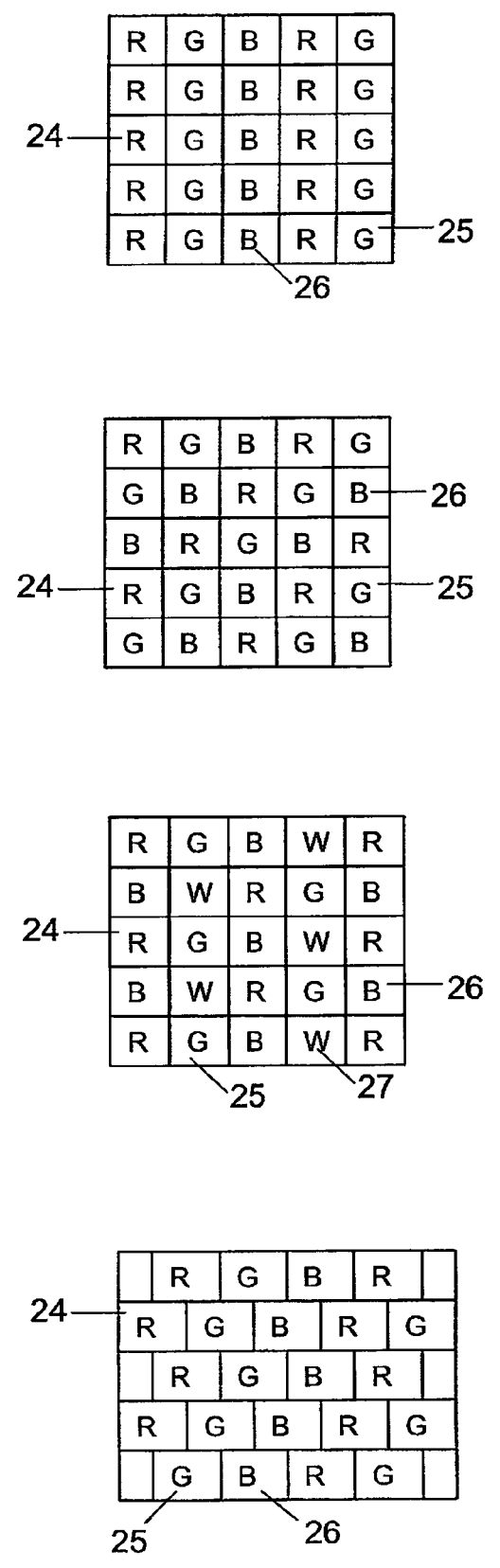

FIG. 13a shows a 1 dimensional colour pixel layout;

FIG. 13b shows a 2 dimensional colour pixel layout;

FIG. 13c shows a colour pixel layout incorporating white pixels (A Pentile Display);

FIG. 13d shows a staggered colour pixel layout;

FIG. 16a shows a viewing window of pixel 1a;

FIG. 16b shows a modelled angular response of luminance for pixel 1a;

BEST MODE FOR CARRYING OUT THE INVENTION

Figure 29:
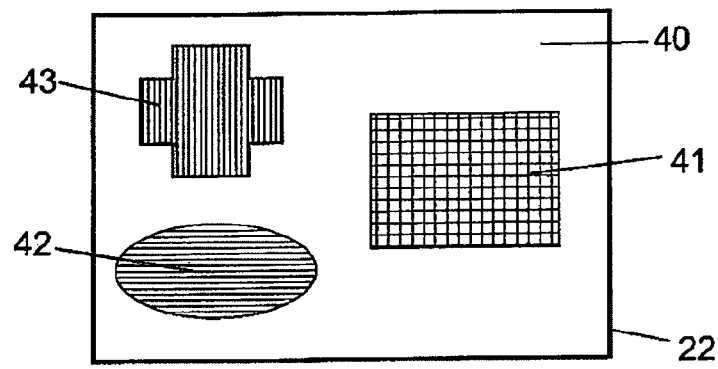
FIG. 29 shows a display simultaneously exhibiting 4 different image display functions.
Figure 30:
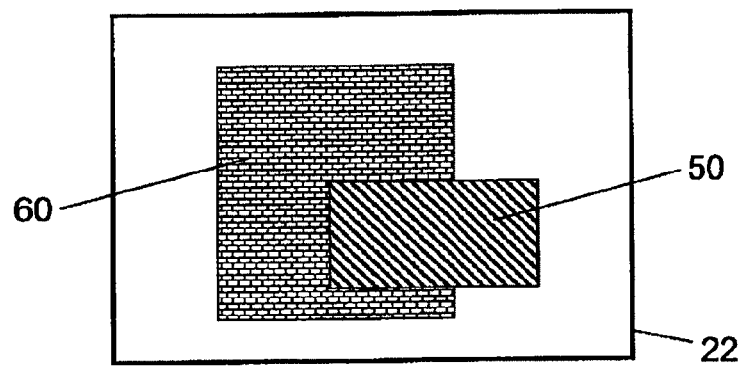
FIG. 30 shows a display with a user defined image function area.

FIG. 29 illustrates a multiple image function display 22 that is simultaneously exhibiting, but not limited to, four different image functions 40, 41, 42, 43. The image functions 40, 41, 42, 43 are of a given size and shape and are at different spatial locations on the display. The image functions may be, but are not limited to, Normal mode 40, 3D mode 41, Private mode 42 and Dual View mode 43. The image functions 40, 41, 42 43 can be activated in either a pre-defined area of the display or a user-defined area of the display 50 (FIG. 30). The image functions 40, 41, 42 and 43 can also be associated with a specific window 61 (FIG. 31) running an application, such as a word processor, spreadsheet, picture image viewer or video image viewer. Such a window 61 would retain the assigned image function regardless of the window's position on the display 22.

The display 22 contains a control arrangement (or cooperates with an external control arrangement) which selects which image functions, or "display viewing modes", are performed by which regions of the display device. Any region of the display device, typically comprising a plurality of "topologically connected" pixels, is capable of performing any of the image functions so that the control arrangement may select arbitrarily any display device region to perform any image function according to the current application of the display. The image functions are performed simultaneously and are selected exclusively by the control arrangement selecting which display device pixels, of each group of pixels associated with a respective parallax element, display which image pixels, as described hereinafter.

Thus, in the example illustrated in FIG. 29, the control arrangement selects an "arbitrary" first region corresponding to 40 of the display device and a first combination of pixels of each group of pixels of the first region to provide a first display viewing mode (such as the Normal mode) having first viewing range characteristics. The control arrangement simultaneously selects "arbitrary" second, third and fourth regions corresponding to 41, 42, 43 of the display device and second, third and fourth combinations of pixels of each group of the respective display device regions to provide second (3D), third (Private) and fourth (Dual View) display viewing modes having different viewing range characteristics from each other and from the first viewing range characteristics.

FIG. 30 shows a user defined area 50 on a multiple image function display 22. The multiple image function display 22 has a window 60 that is running an application, for example, a word processor, a spreadsheet, a picture image viewer or video image viewer. A user-defined area 50 may be created via an input device, such as, for example, a mouse, a keyboard or a touchscreen. A predefined image function 40, 41, 42, 43 may then be attributed to the user-defined area 50 such that the window 60 that spatially overlaps with the user defined area is subject to the image function associated with the user defined area 50. The image function may be, but is not limited to, Normal mode 40, 3D mode 41, Private mode 42 and Dual View mode 43.

With reference to a FIG. 30, let us consider a specific example of a multiple function display 22 with a user-defined image function area 50. In this example, the image function of the user-defined area 50 is a Private mode 42, while all areas outside the user defined area 50 are a Normal mode 40. Information contained within the window 60 that spatially overlaps with the user-defined area 50 that has image function Private mode 42 would be viewable by a person situated substantially on-axis to the display. However, information contained within the window 60 that spatially overlaps with the user-defined area 50 would not be viewable by a person situated substantially off-axis to the display. Information contained within the window 60 that does not spatially overlap with the user-defined area 50 would be viewable by a person situated on-axis to the display and off-axis to the display i.e. the image function for the window 60 that does not spatially overlap with the user-defined area 50 is Normal mode.

Figure 31:
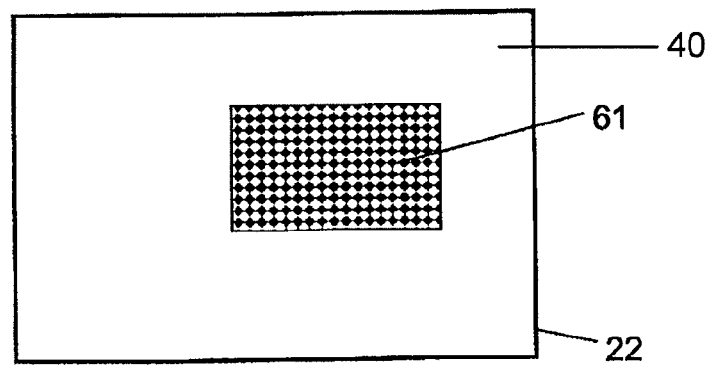
FIG. 31 shows a display with a user defined image function window.

FIG. 31 shows a multiple image function display 22 with the window 61, where the window 61 has a user defined image function 40, 41, 42, 43. The window 61 may, for example, contain an application, such as a word processor, picture viewer, web browser etc. The window 61 may, for example, contain picture and/or text and/or video information. The image function associated with the window 61 may be, but is not limited to, Normal mode 40, 3D mode 41, Private mode 42 and Dual View mode 43. The user, via an input device such as, for example, a mouse, keyboard or touchscreen, may define the image function of the window 61. An automated process may define the image function of window 61. Either a user or an automated process may move ("drag and drop") the window 61 across the display while the window 61 maintains the image function associated with it.

With reference to a FIG. 31, let us consider a specific example of a multiple function display 22 with a window 61 that has a user-defined image function. In this example, the image function of the window 61 is a Private mode 42, while all areas outside the window 61 are a Normal mode 40. Information contained within the window 61 would be viewable by a person situated substantially on-axis to the display. Information contained within the window 61 would not be viewable by a person situated substantially off-axis to the display.

The functionality of permitting the arbitrary selection of different display device regions to have different viewing modes with different viewing range characteristics is provided in the embodiments described hereinafter.

Figure 3:
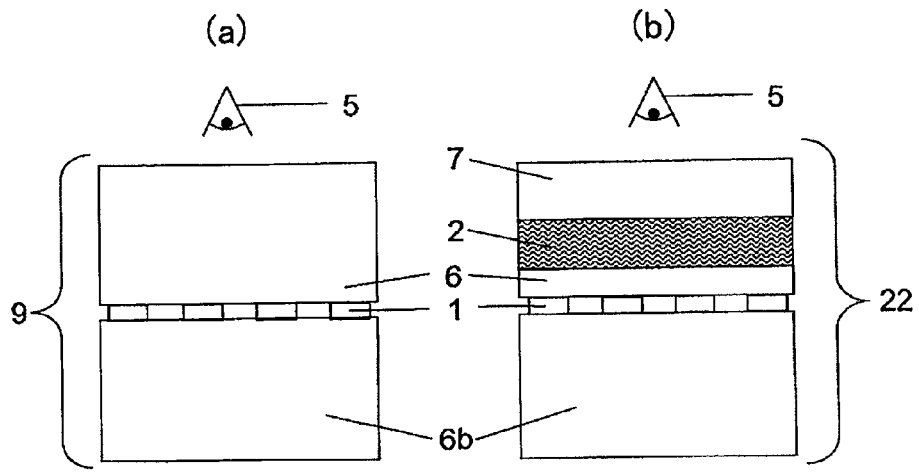
FIG. 3a shows a pixellated display (an image panel)
FIG. 3b shows a parallax optic formed on a substrate and attached to an image panel.
Figure 11A:
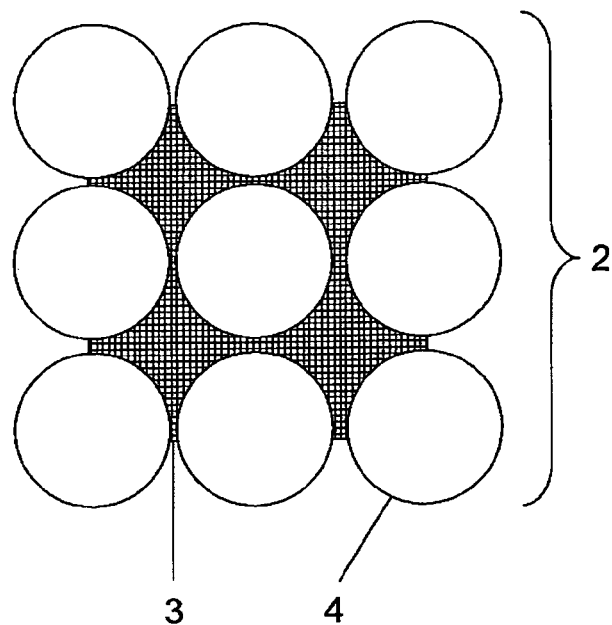
FIG. 11a shows a parallax optic comprised of spherical lenses.
Figure 11B:
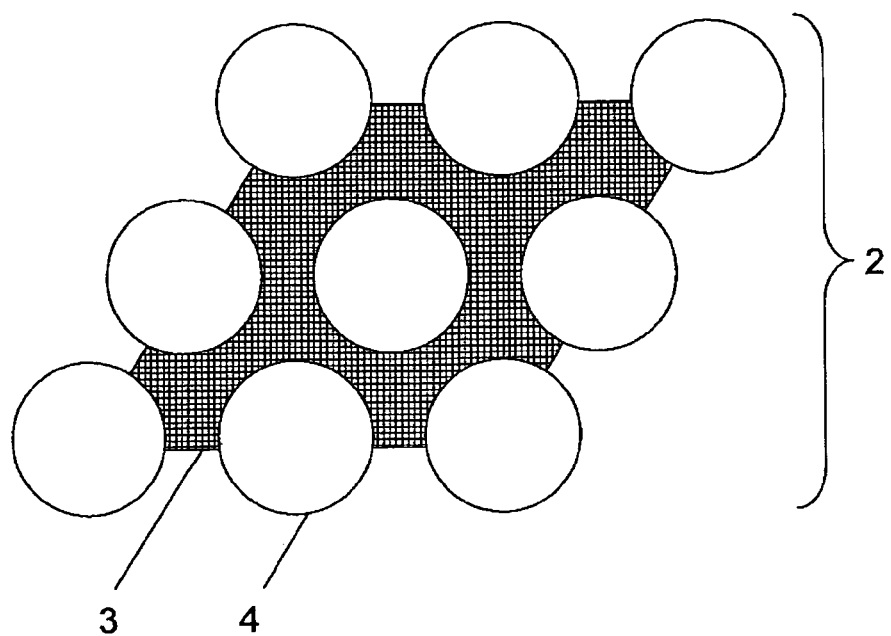
FIG. 11b shows a parallax optic comprised of spherical lenses.
Figure 15:
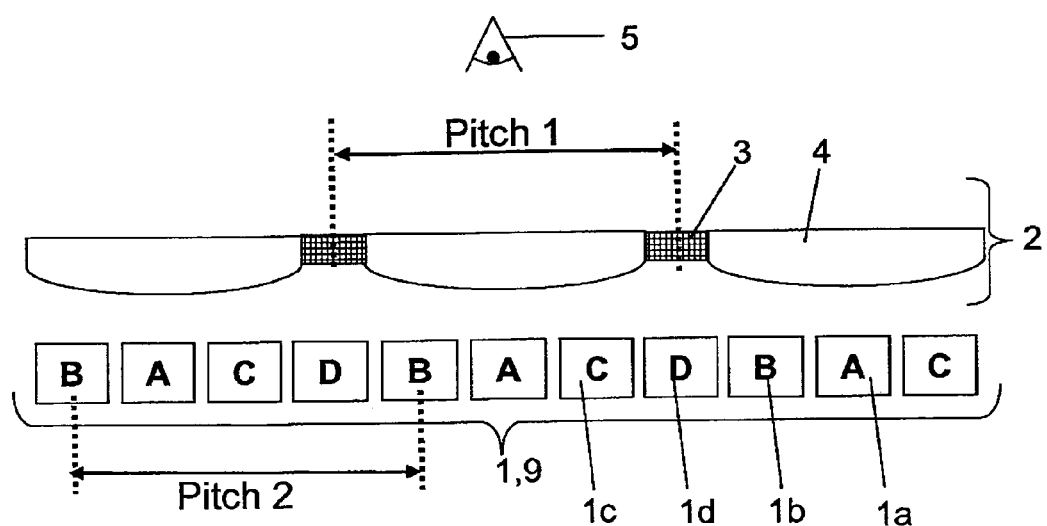
FIG. 15 shows a directional display consisting of a parallax optic and a pixellated display.

A preferred embodiment is shown schematically in FIG. 15 and comprises a non-controllable parallax optic 2 and display 9, as detailed in FIG. 3b. The parallax optic is formed according to FIG. 7a, and comprises of an array of lens elements 4 whereby the spaces between the lens elements are filled with a non-transparent material 3. Alternative parallax optic options are illustrated in FIGS. 7b, c and d. The lens elements 4 are of the cylindrically converging type and provide one-dimensional parallax. However, as an alternative, the lens elements 4 may be spherically converging and may provide two-dimensional parallax (for example as shown in FIGS. 11a and 11b). The parallax optic 2 in FIG. 15 has a pitch (Pitch 1) that is substantially the same as the pitch of four pixels (Pitch 2) of the display 9. Pitch 2 incorporates pixel types A, B, C and D. The pixels of types A, B, C and D associated with each lens element 4 form a group with a first pixel 1a aligned with the lens element 4, second and third pixels 1b, 1c on opposite sides of the first pixel 1a and fourth pixels 1d outside the second and third pixels. Each fourth pixel is shared with an adjacent group of pixels. Pixels 1a, 1b, 1c and 1d of types A, B, C and D, respectively, may be white pixels. Pixels 1a, 1b, 1c and 1d of types A, B, C and D, respectively may be colour sub-pixels. The lens 4 apex is centred substantially around pixel type A.

Figure 10A:
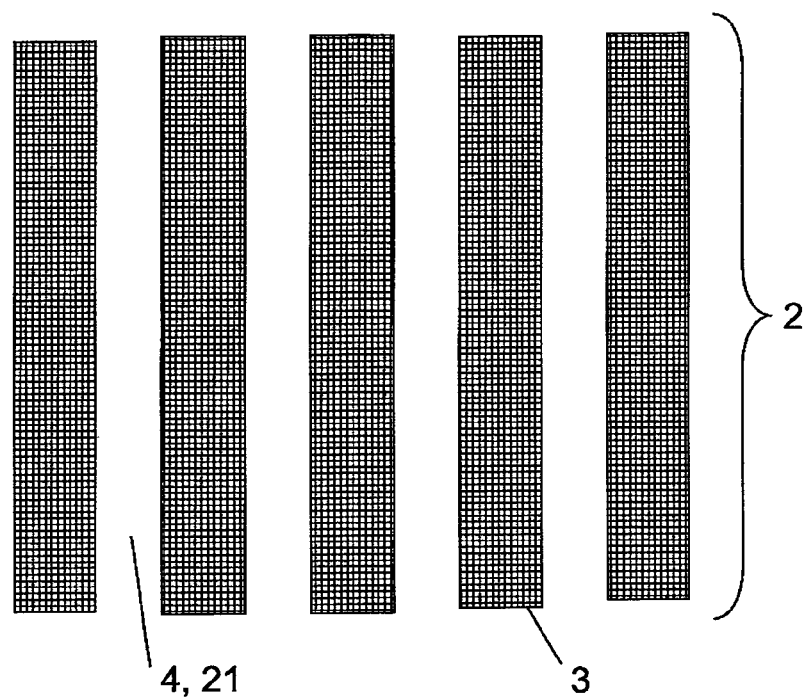
FIG. 10a shows a parallax optic consisting of stripes of optical elements.
Figure 16A:
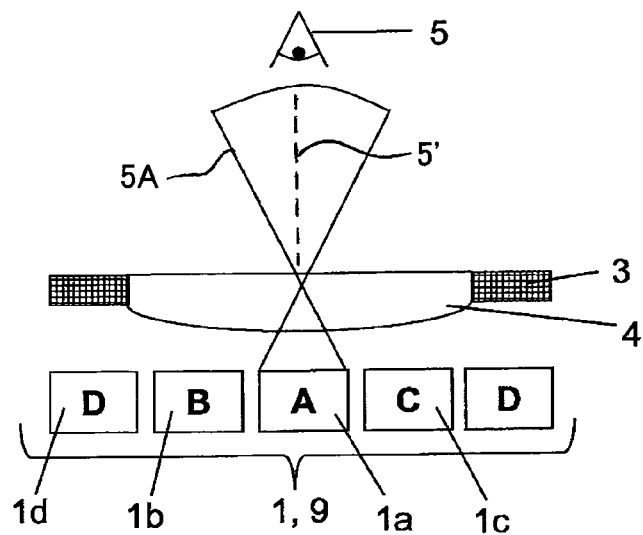
Figure 16B:
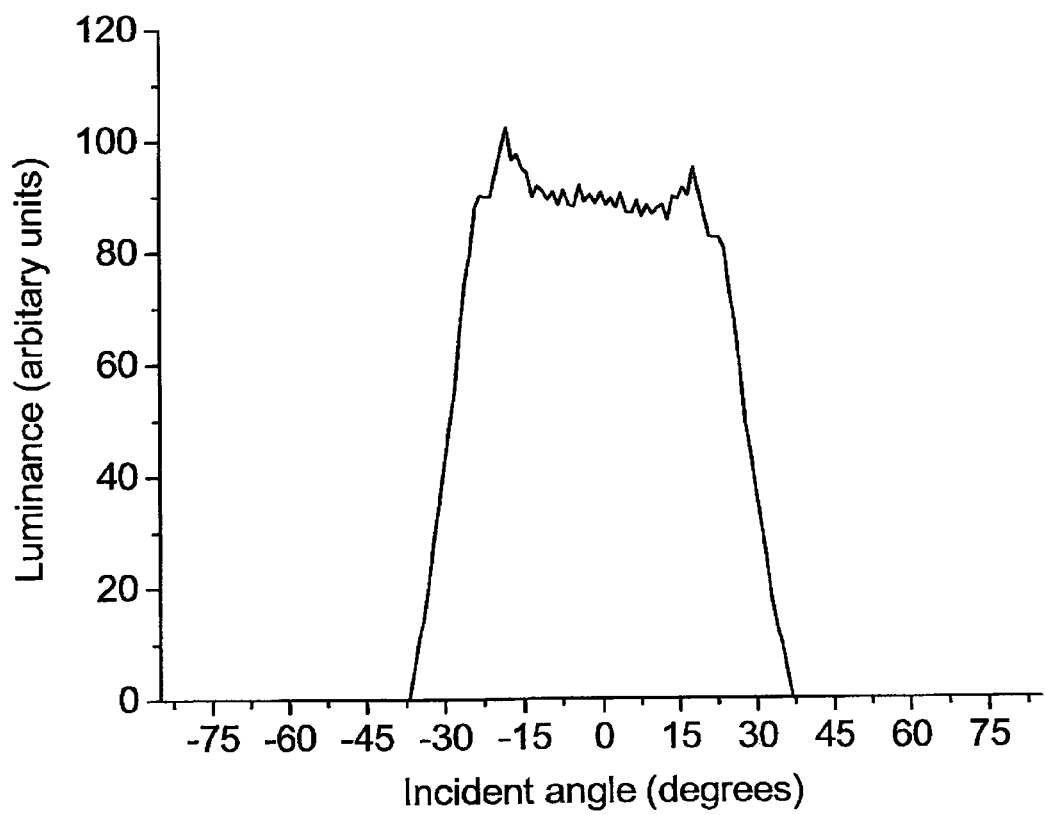

Satisfactory imaging performance was found to occur when the ratio of the width of the non-transparent material 3 (barrier) to the pitch of the parallax optic (Pitch 1) was between 0% and 40%, with a preferred value of around 20%. A large barrier width to lens width ratio results in good imaging capabilities. However, if the ratio is too large, image artefacts arise from the fact that the barrier becomes visible. Therefore a barrier width must be selected that is substantially unobtrusive for the viewer but achieves sufficient imaging results. A barrier arranged in a chequerboard configuration (FIG. 10b) provides less visible image artefacts than a one dimensional barrier configuration (FIG. 10a). Preferred performance was found using a barrier width of 60 μm, a lens width of 240 μm, a lens height of 50 μm and a lens with a radius of curvature of 200 μm. A distance equal to the thickness of the substrate 6 separates the apex of the lens from the pixel layer. Satisfactory imaging performance was found to occur when the thickness of substrate 6 was varied between 30 μm and 200 μm. Preferred performance was found to occur when the thickness of substrate 6 was around 100 μm. In general, preferred imaging performance was found to occur when the thickness of the substrate 6 enabled the parallax optic to produce an angular dependent viewing window for the pixel type A as per FIG. 16b such that pixel type A is substantially viewable on-axis by viewer 5 of the display and substantially not viewable off-axis by viewers 5b, 5c to the display 9.

Figure 12A:
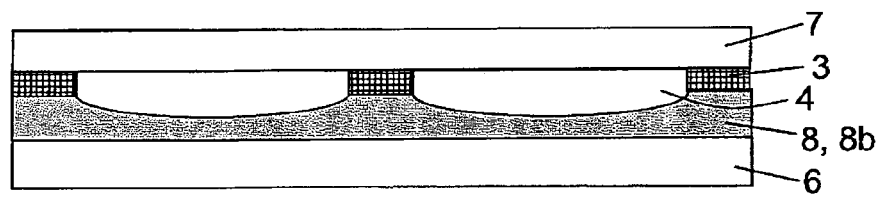
FIG. 12a shows a parallax optic adhered to the substrate of the image display.
Figure 12B:
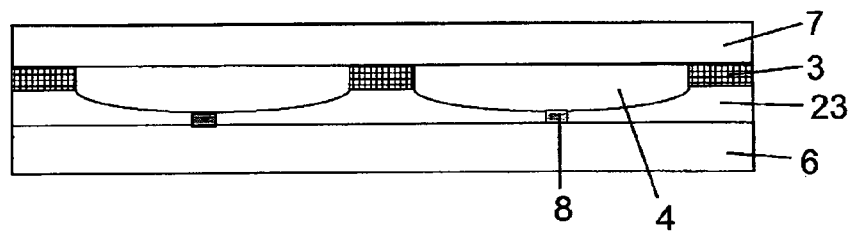
FIG. 12b shows a parallax optic adhered to the substrate of the image display.
Figure 12C:
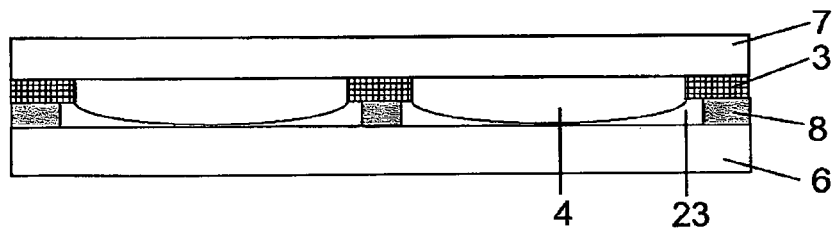
FIG. 12c shows a parallax optic adhered to the substrate of the image display.
Figure 12D:
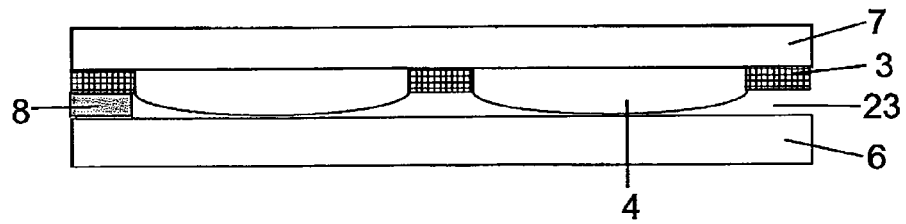
FIG. 12d shows a parallax optic adhered to the substrate of the image display.
Figure 12E:
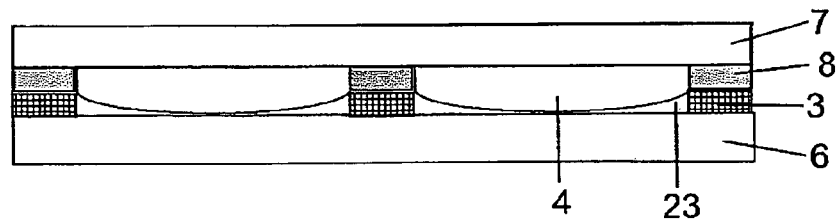
FIG. 12e shows a parallax optic adhered to the substrate of the image display.

The preferred imaging performance was found to occur when the parallax optic was adhered to the pixellated display according to. FIG. 12d. The individual pixel types A, B, C and D of each group cooperate with the respective lens such that corresponding pixels of the groups are viewable in respective different viewing regions or "windows" in front of the display 9 and the parallax optic 2 (which is thus between the display 9 and the viewing windows). The angular dependent viewing region or window 5A of pixel type A is illustrated schematically in FIG. 16a and modelled exactly in FIG. 16b according to the details of the preferred imaging conditions detailed above. Pixel type A substantially provides an image viewable on-axis by a viewer 5 and around the "central" axis 5' of the display 9. Pixel type A does not provide an image that is viewable substantially off-axis by viewers 5b, 5c to the display 9.

Figure 17A:
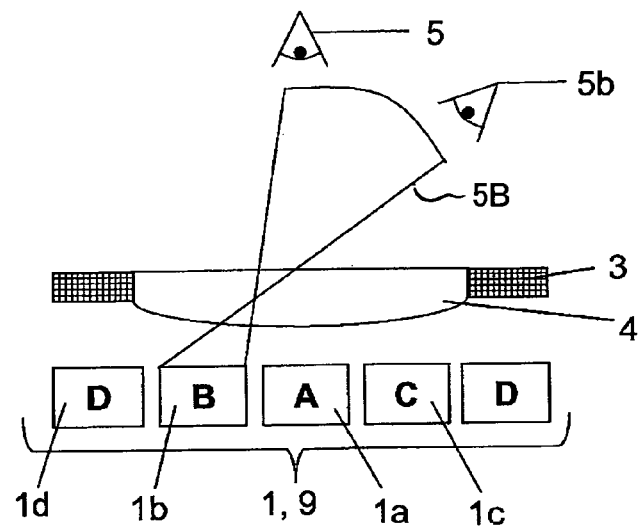
FIG. 17a shows a viewing window of pixel 1b.
Figure 17B:
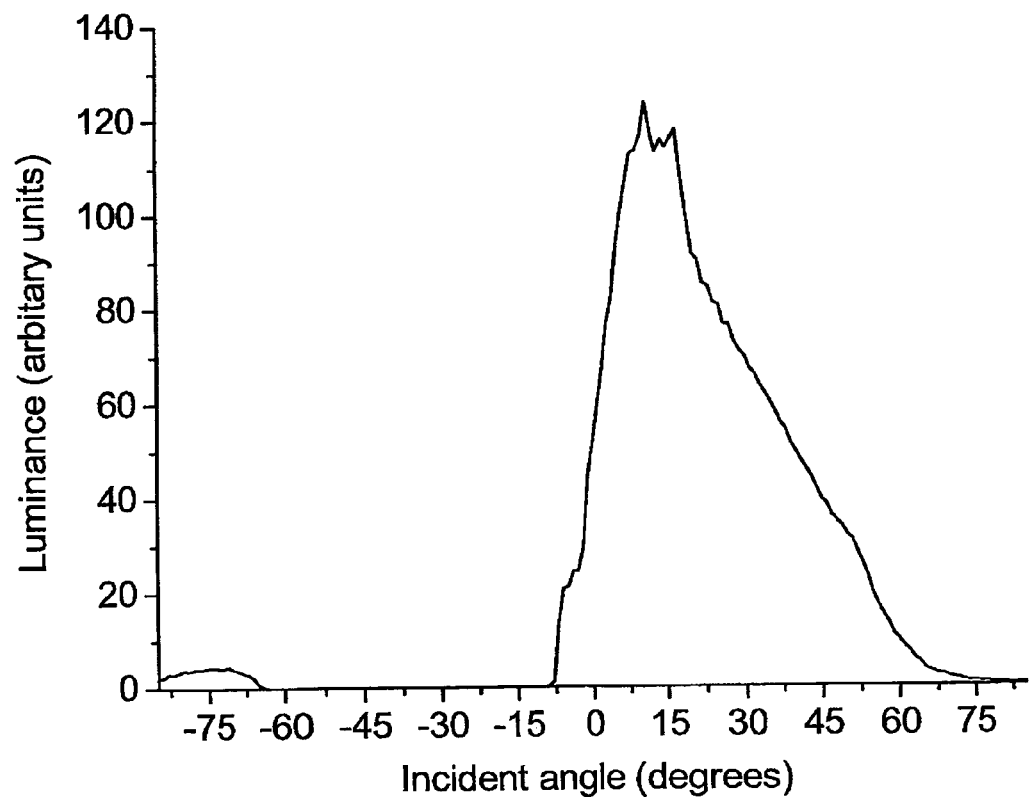
FIG. 17b shows a modelled angular response of luminance for pixel 1b.

The angular dependent viewing region or window 5B of pixel type B is illustrated schematically in FIG. 17a and modelled exactly in FIG. 17b according to the details of the preferred imaging conditions detailed above. Pixel type B substantially provides an image viewable on-axis by viewer 5 and off-axis to the left by viewer 5b of the display 9. Pixel type B does not provide an image that is viewable substantially off-axis to the right by viewer 5c of the display 9.

Figure 18A:
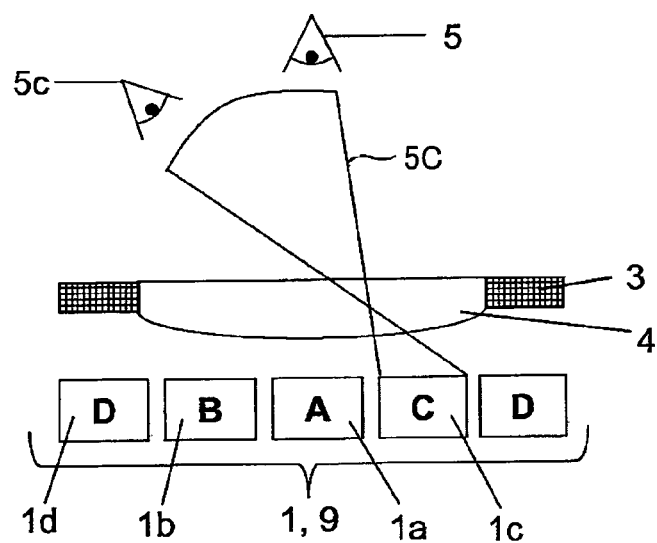
FIG. 18a shows a viewing window of pixel 1c.
Figure 18B:
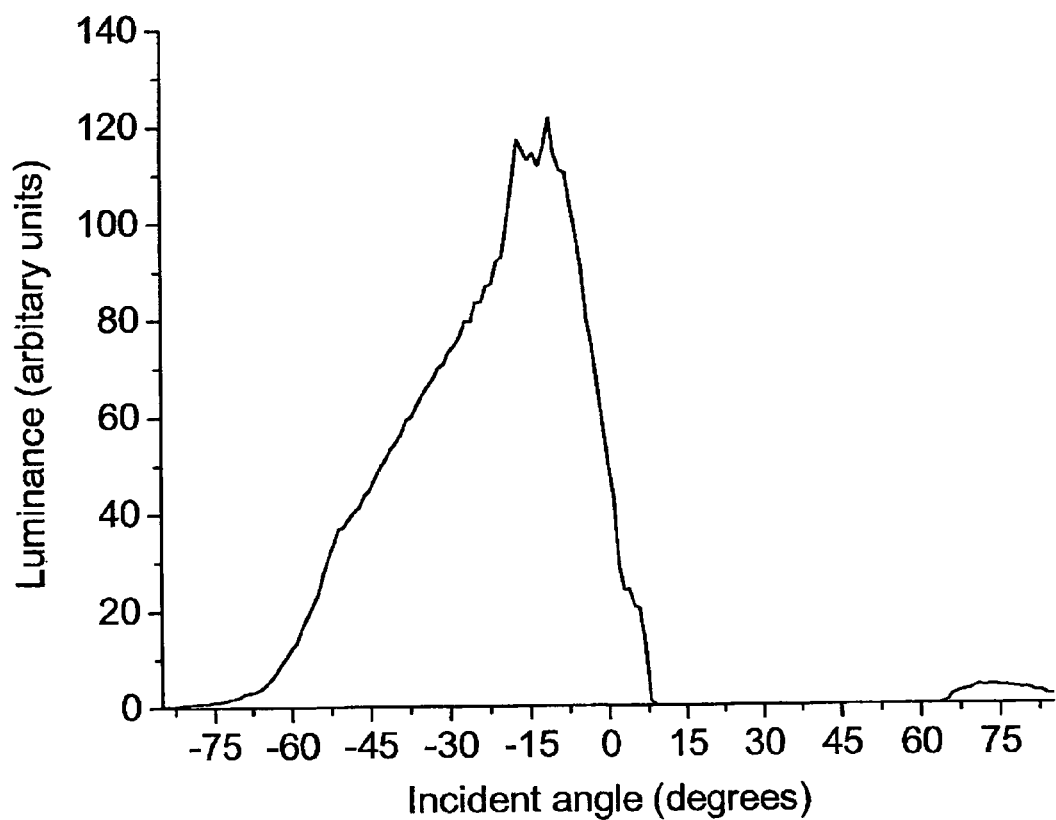
FIG. 18b shows a modelled angular response of luminance for pixel 1c.

The angular dependent viewing region or window 5C of pixel type C is illustrated schematically in FIG. 18a and modelled exactly in FIG. 18b according to the details of the preferred imaging conditions detailed above. Pixel type C substantially provides an image viewable on-axis by viewer 5 and off-axis to the right by viewer 5c of the display 9. Pixel type C does not provide an image that is viewable substantially off-axis of the left by viewer 5b of the display 9.

Figure 19A:
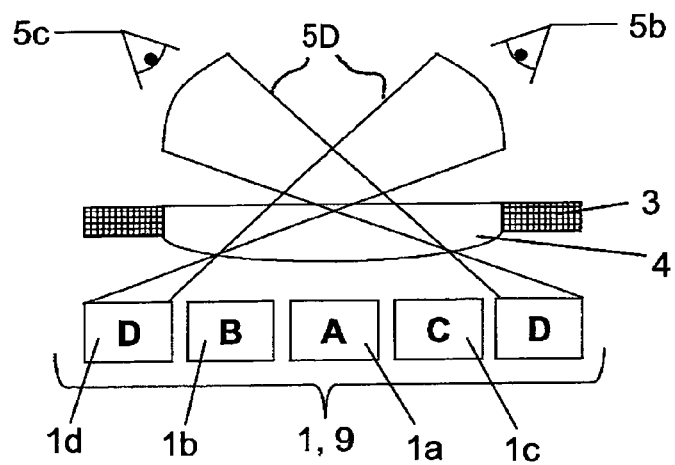
FIG. 19a shows a viewing window of pixel 1d.
Figure 19B:
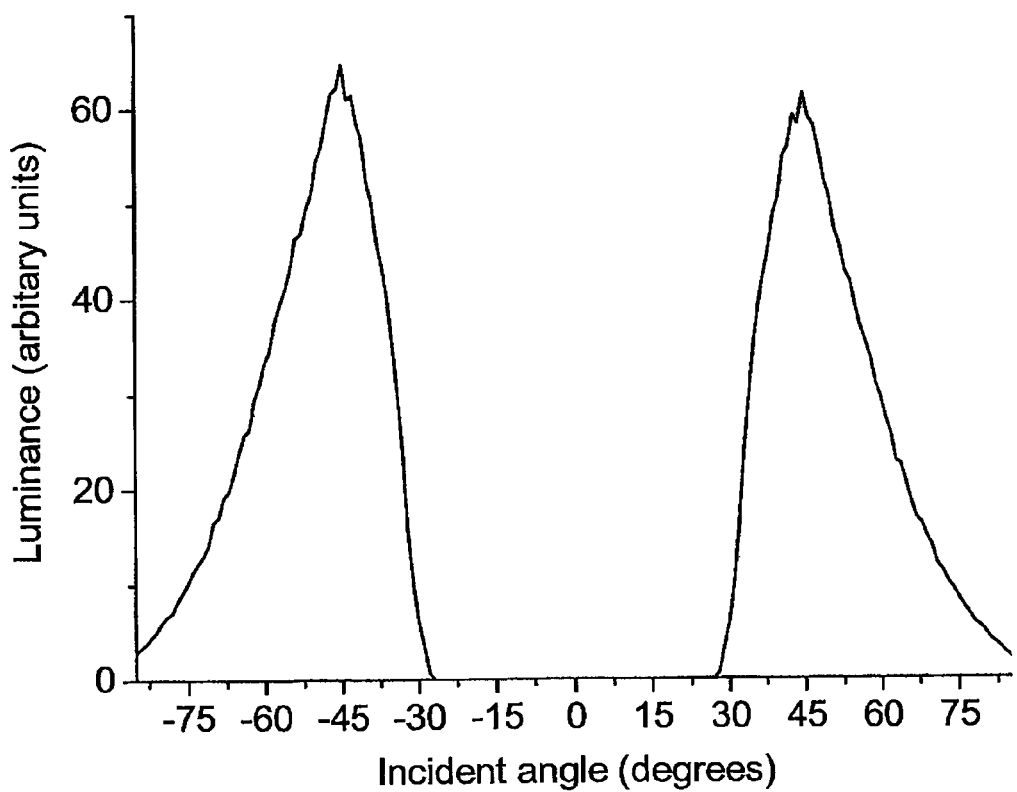
FIG. 19b shows a modelled angular response of luminance for pixel 1d.

Each angular dependent viewing region or window 5D of pixel type D is illustrated schematically in FIG. 19a and modelled exactly in FIG. 19b according to the details of the preferred imaging conditions detailed above. Pixel type D substantially provides an image viewable off-axis to the right by viewer 5c and off-axis to the left by viewer 5b of the display 9. Pixel type D does not provide an image that is viewable substantially on-axis by viewer 5 of the display 9. Undesirable image artefacts can be minimised by arranging pixel types A, B, C and D to produce the same colour in any given row and/or column of the display.

As is clear from FIGS. 16b, 17b, 18b and 19b, the pixel types A, B, C and D cooperate with the lens elements 4 to produce viewing regions such that adjacent ones of these regions partially overlap.

Figure 20A:
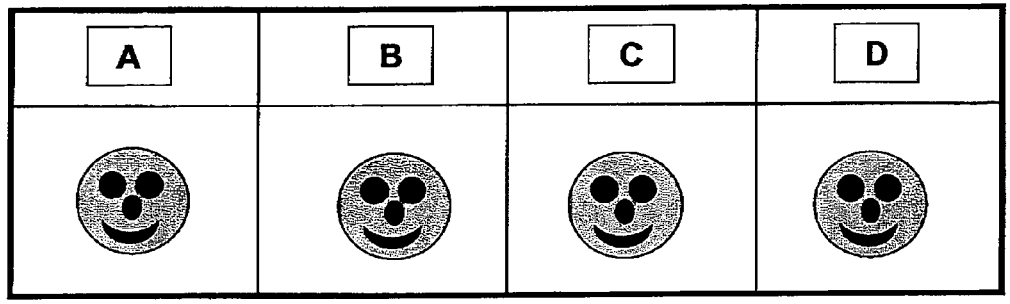
FIG. 20a shows image addressing to pixels that yields a public, wide view mode.
Figure 20B:
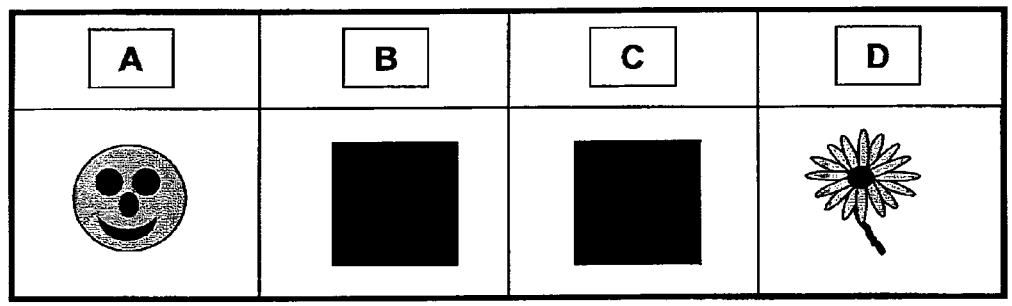
FIG. 20b shows image addressing to pixels that yields a strong privacy mode.

The use of a parallax optic 2 and a pixellated display 9 as illustrated in FIG. 15 realises a display capable of multiple image functions. In order to actually achieve the multiple image functionality, it is necessary to address images to the pixellated display in a predetermined way. More specifically, different images must be spatially interlaced in a predefined way. Selection of the display mode is determined exclusively by pixel selection of each group. A method of addressing images to the pixel types A, B, C and D for the embodiment outlined in FIG. 15 is shown in FIGS. 20a-q. FIG. 20a illustrates that, by addressing pixel types A, B, C and D with the same image (a face), a wide angle view public mode is achieved (i.e. the face is viewable from all directions). FIG. 20b illustrates that, by addressing pixel type A with a first image (a face) and addressing pixel type D with a second image (a flower) that is different to the first image and addressing pixel types B and C with a third image that is substantially black image (black square), then a strong privacy mode is realised whereby the first image (a face) is substantially viewable on-axis by viewer 5 while the second image (a flower) is substantially viewable off-axis by viewers 5b, 5c.

Figure 20C:
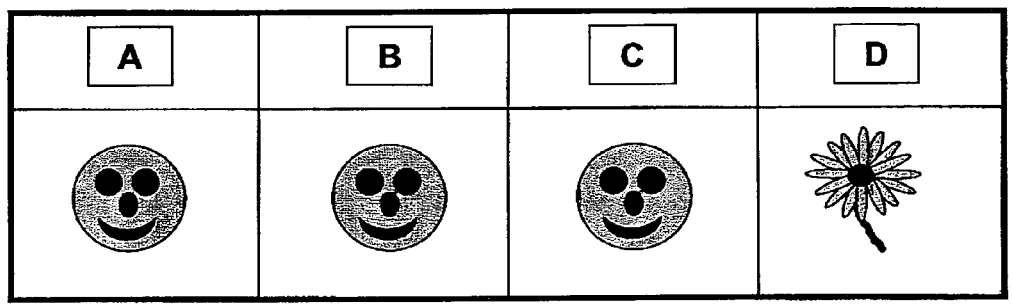
FIG. 20c shows image addressing to pixels that yields a privacy mode.

FIG. 20c illustrates that, by addressing pixel types A, B and C with a first image (a face) and addressing pixel type D with a second image (a flower), then a privacy mode is realised whereby the first image (a face) is substantially viewable on-axis by viewer 5 while the image viewable off axis by viewers 5b, 5c is an interlacing of both the first and second images (an interlacing of the face and the flower). Thus, a degree of privacy for the on-axis first image (the face) is provided. The privacy strength (i.e. the degree to which the on-axis image is obscured to an off-axis viewer) provided by FIG. 20b is better than the privacy strength provided by FIG. 20c. However, the on-axis image quality in terms of brightness and resolution that is provided by addressing scheme FIG. 20c is better than the addressing scheme illustrated in FIG. 20b.

Figure 20D:
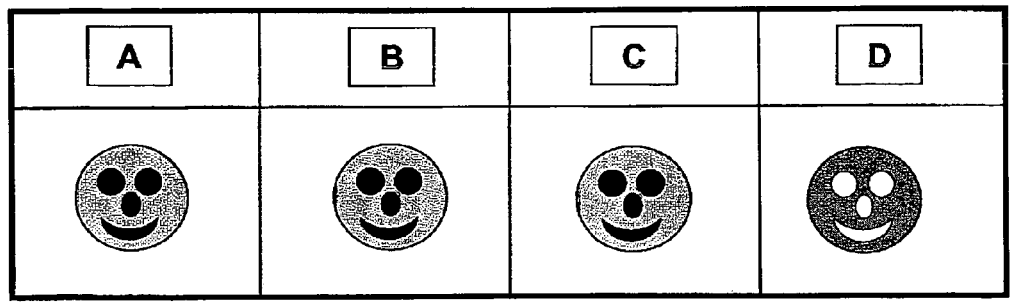
FIG. 20d shows image addressing to pixels that yields a washout, image cancellation privacy mode.

FIG. 20d illustrates addressing pixel types A, B and C with a first image (a face) and addressing pixel type D with a second image (a face) whereby the second image is derived from the first image by changing the luminance values in a predetermined manner such that the second image is effectively the luminance inverse or 'negative' of the first image (i.e. pixels with low luminance values in the first image become pixels with high luminance values in the second image and vice versa). The original face image (unaltered luminance values) is substantially viewable on-axis by viewer 5 while the image viewable off axis by viewers 5b, 5c is an interlacing of both the face and the 'negative' face images, which results in an off-axis image that is substantially devoid of contrast and thus is difficult to interpret (i.e. an off-axis privacy function has been realised). The privacy strength of the addressing scheme illustrated in FIG. 20d may be stronger than the privacy strength provided by the addressing scheme illustrated in FIG. 20c.

Figure 20E:
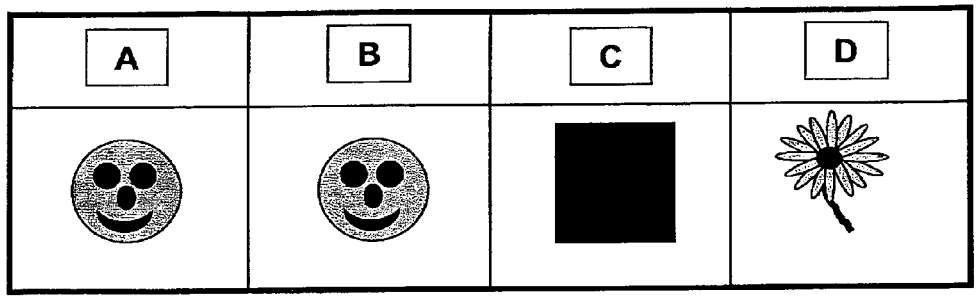
FIG. 20e shows image addressing to pixels that yields asymmetric privacy strength.
Figure 20F:
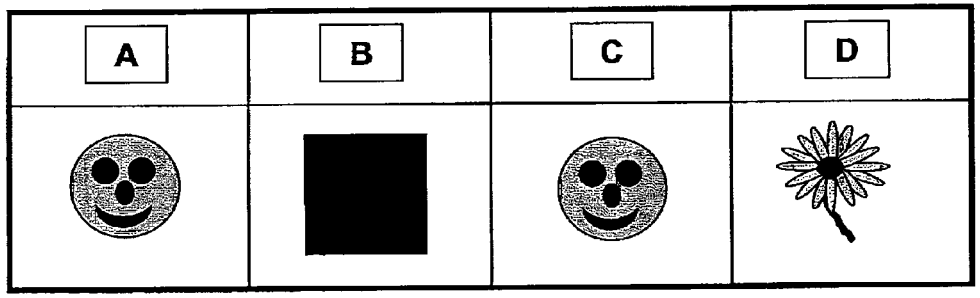
FIG. 20f shows image addressing to pixels that yields asymmetric privacy strength.

FIG. 20e illustrates that, by addressing pixel types A and B with a first image (a face), addressing pixel type C with a second image that is substantially black (black square) and addressing pixel type D with a third image (a flower), then strong privacy as described for addressing scheme FIG. 20b is achieved off-axis to the right as seen by viewer 5c of the display 9 while privacy as described for addressing scheme FIG. 20c is achieved off-axis to the left as seen by viewer 5b of the display 9. FIG. 20f illustrates that, by addressing pixel types A and C with a first image (a face), addressing pixel type B with a second image that is substantially black (black square) and addressing pixel type D with a third image (a flower), then strong privacy as described for addressing scheme FIG. 20b is achieved off-axis to the left as seen by viewer 5b of the display 9 while privacy as described for addressing scheme FIG. 20c is achieved off-axis to the right as seen by viewer 5c of the display 9.

Figure 20G:
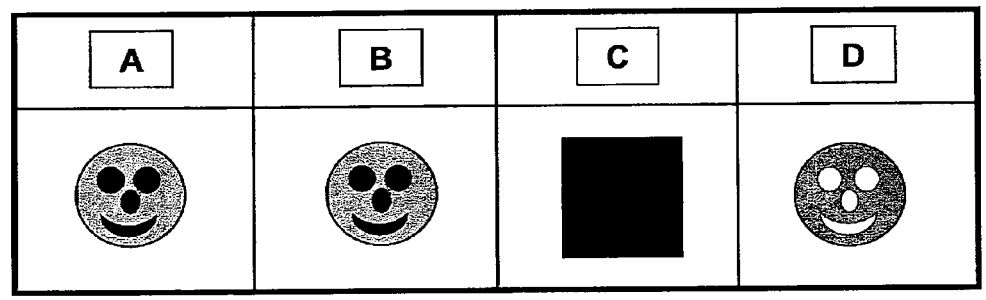
FIG. 20g shows image addressing to pixels that yields asymmetric privacy strength.

FIG. 20g illustrates that, by addressing pixel types A and B with a first image (a face), addressing pixel type C with a second image that is substantially black (black square) and addressing pixel type D with a third image that is the 'negative' of the image addressed to pixel types A and B (a 'negative' face), then strong privacy as described for addressing scheme FIG. 20b is achieved off-axis to the right as seen by viewer 5c of the display 9 while privacy as described for addressing scheme FIG. 20d is achieved off-axis to the left as seen by viewer 5b of the display 9.

Figure 20H:
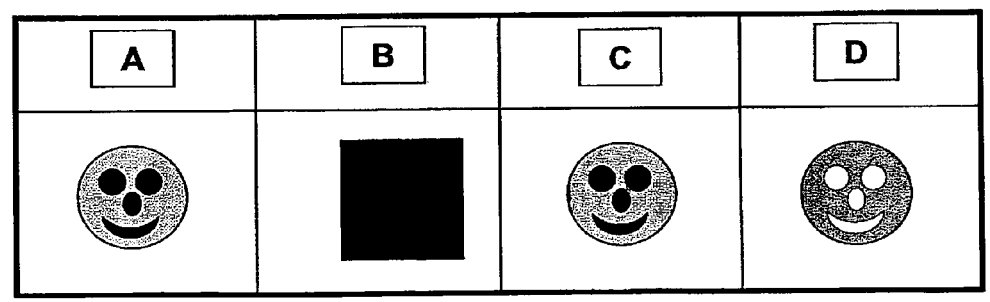
FIG. 20h shows image addressing to pixels that yields asymmetric privacy strength.

FIG. 20h illustrates that, by addressing pixel types A and C with a first image (a face), addressing pixel type B with a second image that is substantially black (black square) and addressing pixel type D with a third image that is the 'negative' of the image addressed to pixel types A and C (a face), then strong privacy as described for addressing scheme FIG. 20b is achieved off-axis to the left as seen by viewer 5b of the display 9 while privacy as described for addressing scheme FIG. 20d is achieved off-axis to the right as seen by viewer 5c of the display 9.

Figure 20I:
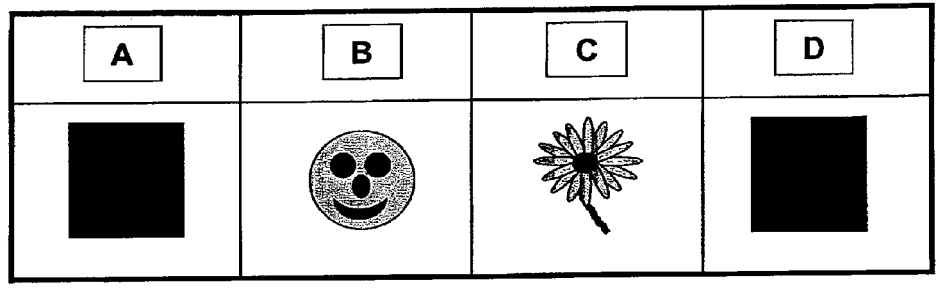
FIG. 20i shows image addressing to pixels that yields a Dual View mode.

FIG. 20i illustrates that, by addressing pixel types A and D with a first image that is substantially black (black square), addressing pixel type B with a second image (a face) and addressing pixel type C with a third image (a flower), a dual view display 9 is realised whereby the second image (a face) is substantially viewable off-axis to the left by viewer 5b of the display 9 and the third image (a flower) is substantially viewable off-axis to the right by viewer 5c of the display 9.

Figure 20J:
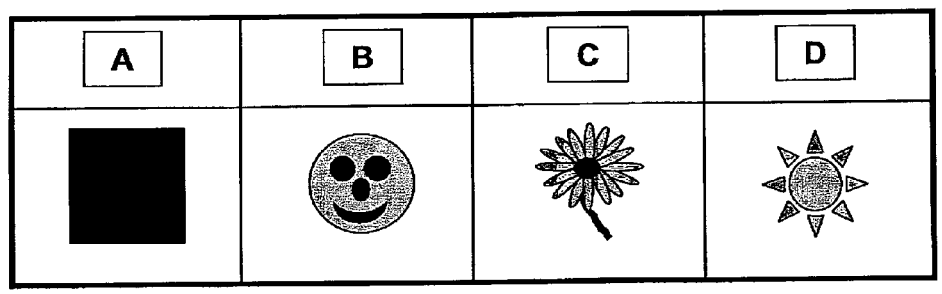
FIG. 20j shows image addressing to pixels that yields a Dual View mode with off-axis privacy.

FIG. 20j illustrates that by addressing pixel type A with a first image that is substantially black (black square), addressing pixel type B with a second image (a face), addressing pixel type C with a third image (a flower) and addressing pixel type D with a fourth image (a sun), then a dual view display (as described in FIG. 20i) with off-axis privacy (as described in FIG. 20e) is realised. With reference to FIG. 17b, FIG. 18b, FIG. 19b and FIG. 20j, the viewing window for the second image (a face) occurs for angles ~5 to ~30 degrees off-axis to the left of the display and the viewing window for the third image (a flower) occurs for angles ~5 to ~30 degrees off-axis to the right of the display while the privacy occurs for all angles >~30 degrees off-axis.

Figure 20K:
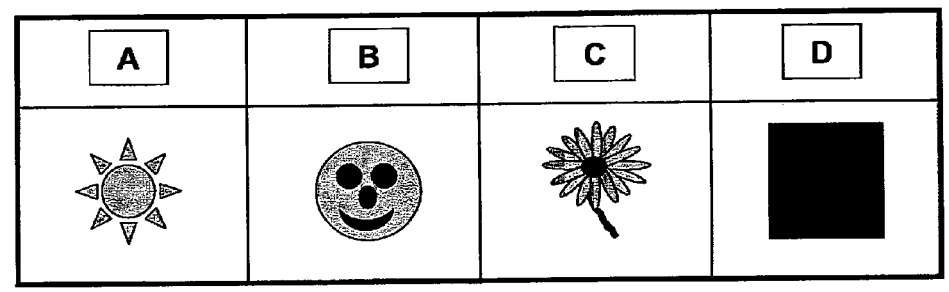
FIG. 20k shows image addressing to pixels that yields a Dual View mode with on-axis privacy.

FIG. 20k illustrates that, by addressing pixel type A with a first image (a sun), addressing pixel type B with a second image (a face), addressing pixel type C with a third image (a flower) and addressing pixel type D with a fourth image that is substantially black (black square), then a dual view display (as described in FIG. 20i) with on-axis privacy is realised. With reference to FIG. 16b, FIG. 17b, FIG. 18b, FIG. 19b and FIG. 20k, the viewing window for the second image (a face) occurs for angles >~30 degrees off-axis to the left of the display and the viewing window for the third image (a flower) occurs for angles >~30 degrees off-axis to the right of the display while a viewer substantially on-axis views an interlaced image comprised of the first, second and third images.

Figure 20L:
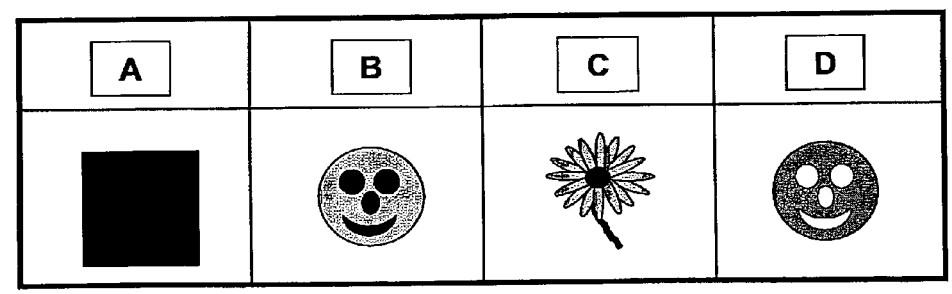
FIG. 20l shows image addressing to pixels that yields a Dual View mode with off-axis privacy.

FIG. 20l illustrates that, by addressing pixel type A with a first image that is substantially black (black square), addressing pixel type B with a second image (a face), addressing pixel type C with a third image (a flower) and addressing pixel type D with a fourth image the 'negative' of the second image (a 'negative' face), then a dual view display is realised (as described in FIG. 20j) with off-axis privacy.

Figure 20M:
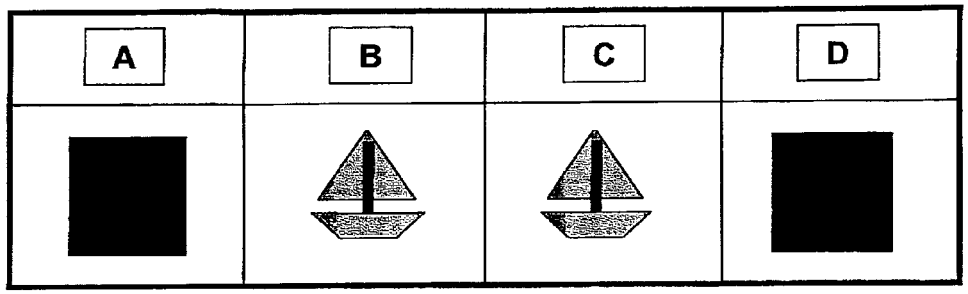
FIG. 20m shows image addressing to pixels that yields an on-axis 3D mode.

FIG. 20m illustrates that, by addressing pixel types A and D with a first image that is substantially black (black square), addressing pixel type B with a second image (a boat as observed by a person's left eye) and addressing pixel type C with a third image (a boat as observed by a person's right eye), then an autostereoscopic image of a boat is viewable on-axis. The second and third images are a "stereoscopic pair of images" and represent the images of the boat when viewed by each eye.

Figure 20N:
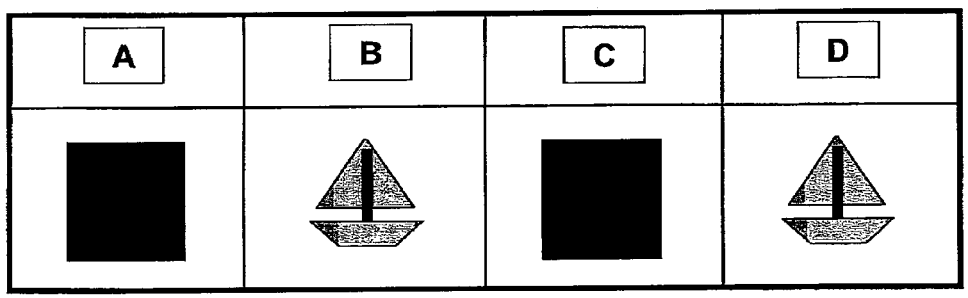
FIG. 20n shows image addressing to pixels that yields an off-axis 3D mode.

FIG. 20n illustrates that, by addressing pixel types A and C with a first image that is substantially black (black square), addressing pixel type B with a second image (a boat as observed by a person's right eye) and addressing pixel type D with a third image (a boat as observed by left eye), then an autostereoscopic image of a boat is viewable off-axis to the left of the display.

Figure 20O:
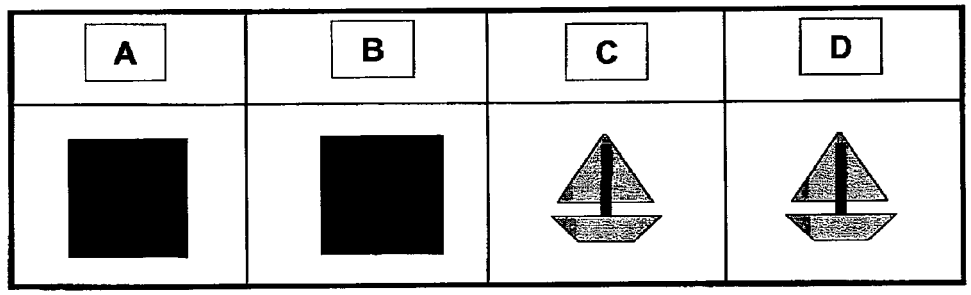
FIG. 20o shows image addressing to pixels that yields an off-axis 3D mode.

FIG. 20o illustrates that, by addressing pixel types A and B with a first image that is substantially black (black square), addressing pixel type C with a second image (a boat as observed by a persons left eye) and addressing pixel type D with a third image (a boat as observed by right eye) then an autostereoscopic image of a boat is viewable off-axis to the right of the display.

Figure 20P:
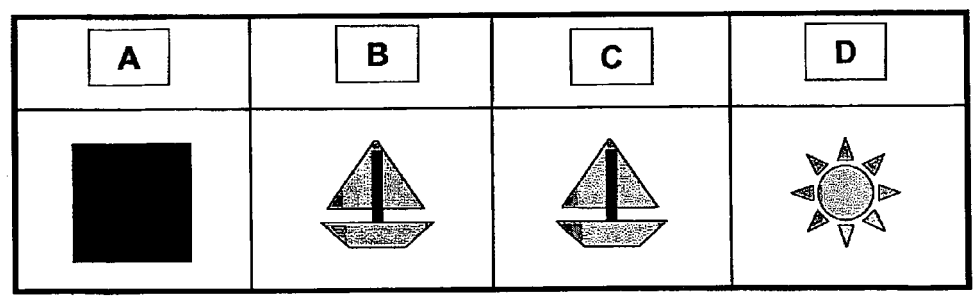
FIG. 20p shows image addressing to pixels that yields an on-axis 3D mode with off-axis privacy.
Figure 20Q:
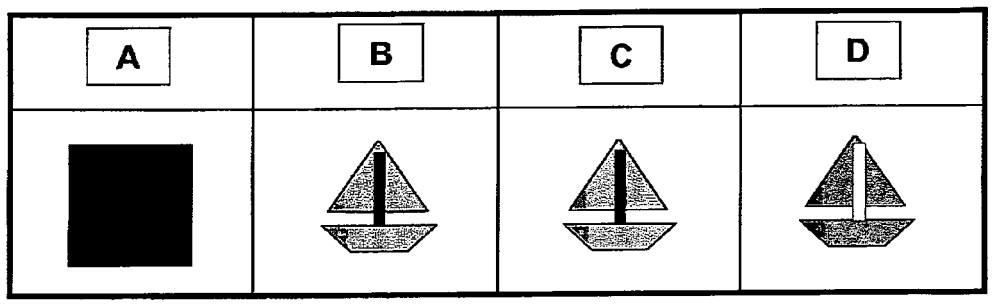
FIG. 20q shows image addressing to pixels that yields an on-axis 3D mode with off-axis washout privacy.

FIG. 20p illustrates that, by addressing pixel type A with a first image that is substantially black (black square), addressing pixel type B with a second image (a boat as observed by a persons left eye), addressing pixel type C with a third image (a boat as observed by a person's right eye) and addressing pixel type D with a fourth image (a sun), then an autostereoscopic image of a boat is viewable on-axis with off-axis privacy as described by FIG. 20c.

FIG. 20q illustrates, that by addressing pixel type A with a first image that is substantially black (black square), addressing pixel type B with a second image (a boat as observed by a person's left eye), addressing pixel type C with a third image (a boat as observed by a person's right eye) and addressing pixel type D with a fourth image (a 'negative boat), then an autostereoscopic image of a boat is viewable on-axis with off-axis privacy as described by FIG. 20d.

Figure 1:
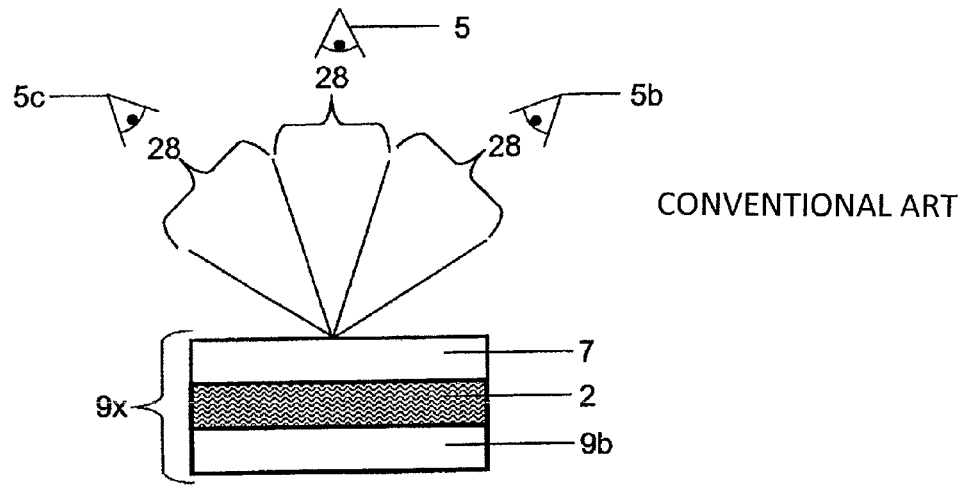
FIG. 1 shows a Triple View Display—prior art.
Figure 2:
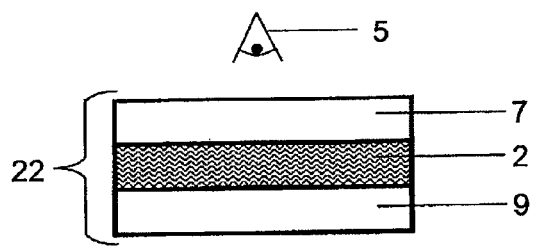
FIG. 2 shows a parallax optic formed on a substrate and attached to an image panel.

FIG. 2 shows a multiple image function display 22 comprised of a pixellated display 9, a parallax optic 2 and substrate 7 on which the parallax optic is formed. The eye 5 indicates the viewing side of the multiple image function display 22. FIG. 3a shows a conventional pixellated display 9, which does not have multiple image function capabilities, comprised of a substrate 6 closest to the viewer 5, a second substrate 6b opposite the substrate 6, and an array of pixels 1. FIG. 3b shows how the conventional display illustrated in FIG. 3a can be modified to realise a display 22 capable of multiple image functions via the addition of a parallax optic 2. It may be necessary to thin the image panel substrate 6 in order to locate the parallax optic 7 at a suitable distance from the pixels 1. In order to reduce thickness and weight of the multiple image function display 22, substrate 7 may be thinned after the parallax optic 2 has been attached to the image display 9.

Figure 4:
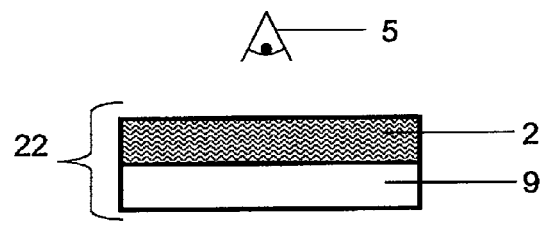
FIG. 4 shows a pixellated display (an image panel)
Figure 5:
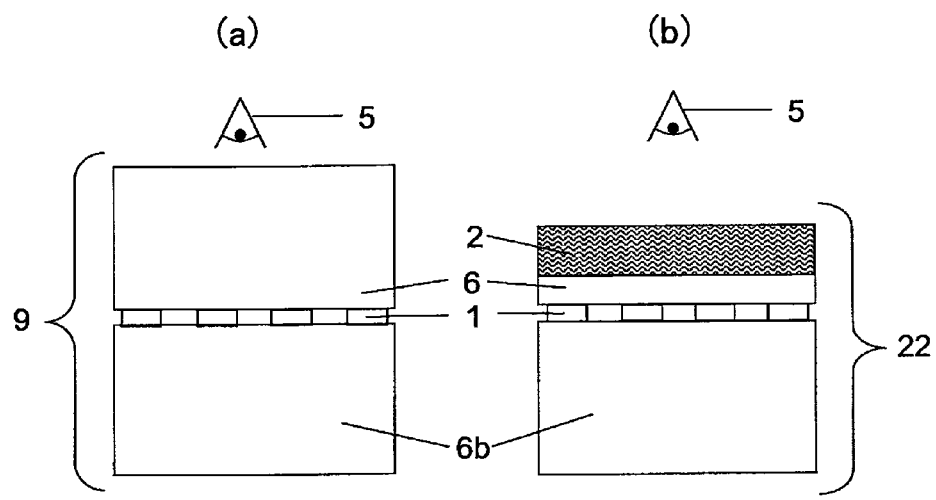
FIG. 5a shows a parallax optic formed on the substrate of an image panel.
FIG. 5b shows a parallax optic formed on the substrate of an image panel.

FIG. 4 shows a multiple image function display 22 comprised of a pixellated display 9 and a parallax optic 2 that is formed directly onto the image display. The eye of a user 5 indicates the viewing side of the multiple image function display 22. FIG. 5a shows a conventional pixellated display, which does not have multiple image function capabilities, comprised of a substrate 6 closest to the viewer 5, a second substrate 6b opposite the substrate 6, and an array of pixels 1. FIG. 5b shows how the conventional display 9 illustrated in FIG. 5a can be modified to realise a display 22 capable of multiple image functions via the addition of a parallax optic 2. It may be necessary to thin the image panel substrate 6 in order to locate the parallax optic 2 at a suitable distance from the pixels 1. The second substrate 6b may remain unchanged.

Owing to the omission of the substrate 7 on which the parallax optic is formed, the display device with multiple image capabilities illustrated in FIG. 5b may be thinner and lighter than the display device illustrated in FIG. 3b.

Figure 6:
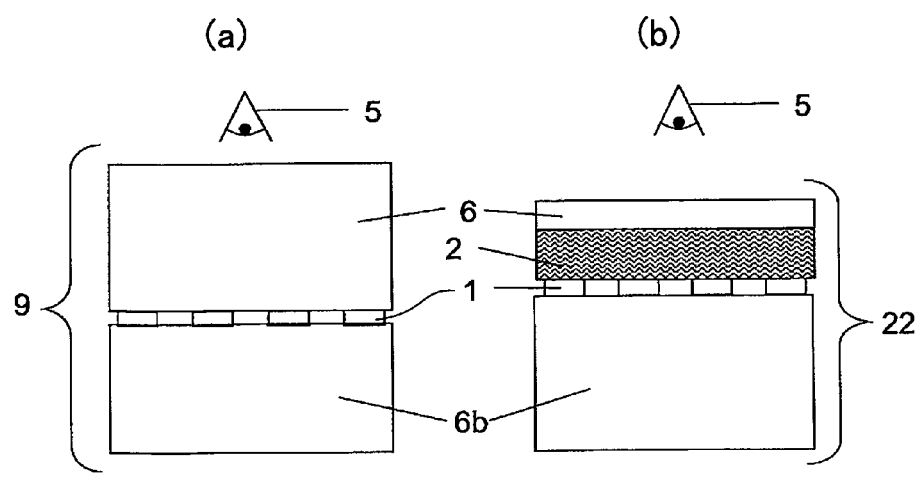
FIG. 6a shows a pixellated display (an image panel)
FIG. 6b shows a parallax optic formed between the substrates of an image panel.

FIG. 6a shows conventional pixellated display 9, which does not have multiple image function capabilities, comprised of a substrate 6 closest to the viewer 5, a second substrate 6b opposite the substrate 6, and an array of pixels 1. FIG. 6b shows how the display of FIG. 6a may be modified to realise a display 22 capable of multiple image functions via the addition of a parallax optic 2. The parallax optic 2 is located between the substrate 6 and the substrate 6b of the image display panel 22.

FIG. 7 illustrates various types of parallax optic 2, formed on a substrate 7, which may be used to realise a display 22 capable of multiple image functions as depicted in FIG. 3b or 6b.

Figure 7A:
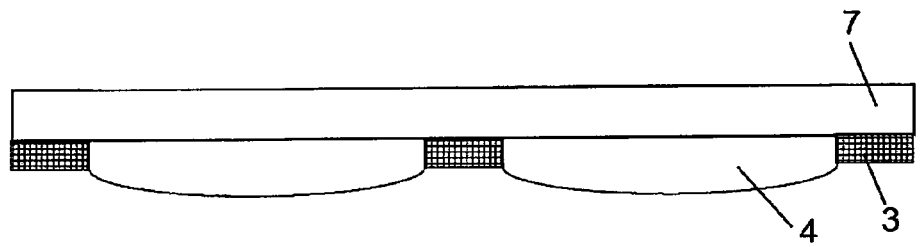
FIG. 7a shows a parallax optic formed on a substrate comprising a lens array and a non-transmitting parallax barrier.
Figure 7B:
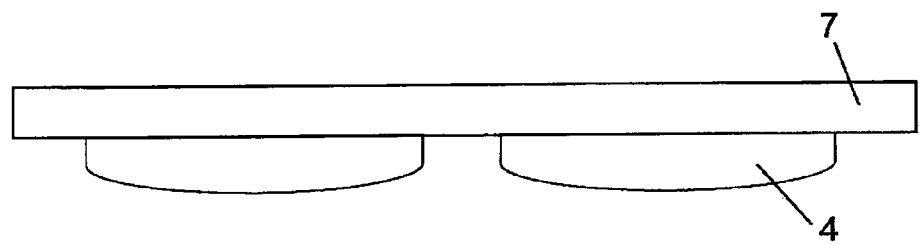
FIG. 7b shows a parallax optic formed on a substrate comprising a lens array.
Figure 7C:
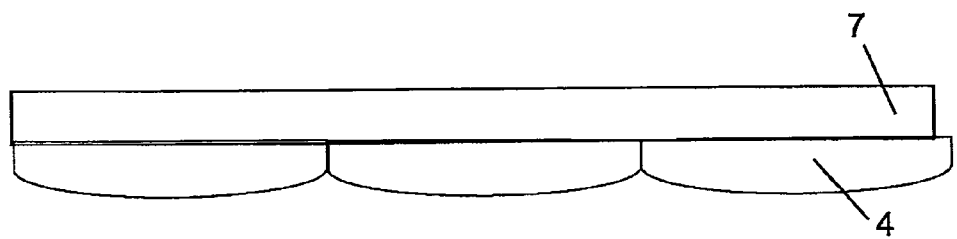
FIG. 7c shows a parallax optic formed on a substrate comprising a close packed lens array.
Figure 7D:
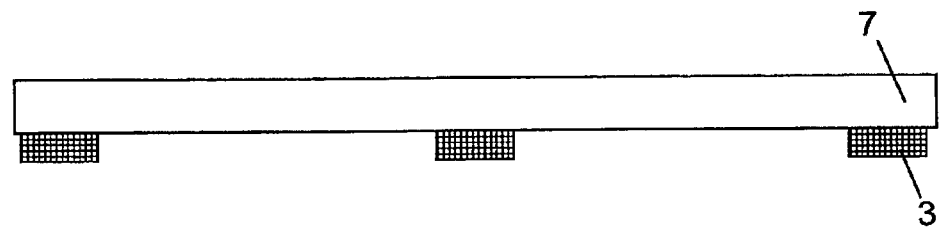
FIG. 7d shows a parallax optic formed on a substrate comprising a non-transmitting parallax barrier.
Figure 8A:
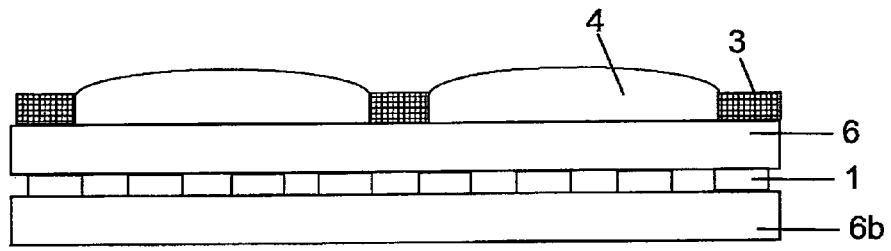
FIG. 8a shows a parallax optic formed on the image display's substrate comprising a lens array and a non-transmitting parallax barrier.
Figure 8B:
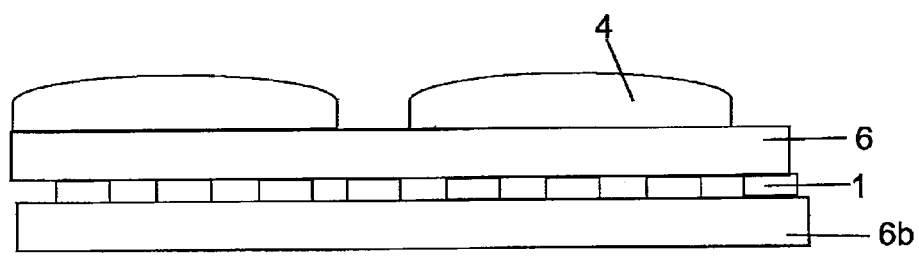
FIG. 8b shows a parallax optic formed on the image display's substrate comprising a lens array.
Figure 8C:
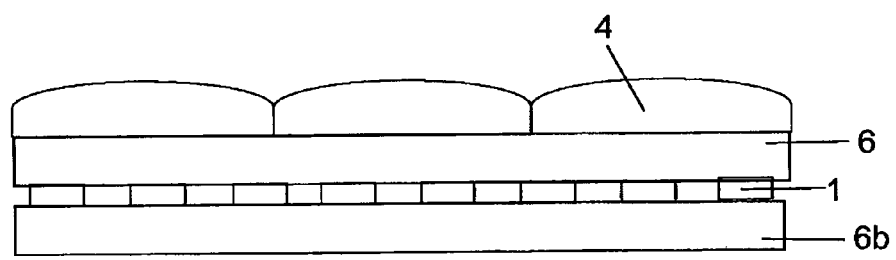
FIG. 8c shows a parallax optic formed on the image display's substrate comprising a closed packed lens array.
Figure 8D:
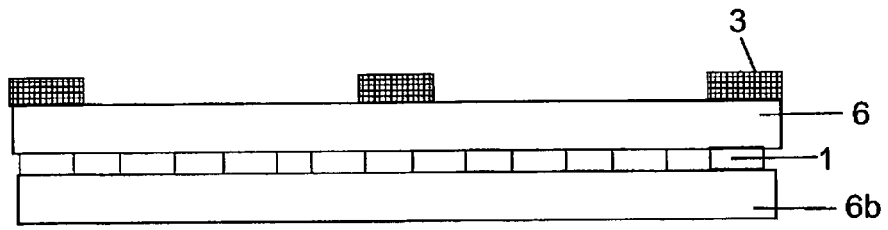
FIG. 8d shows a parallax optic formed on the image display's substrate comprising a non-transmitting parallax barrier.
Figure 9A:
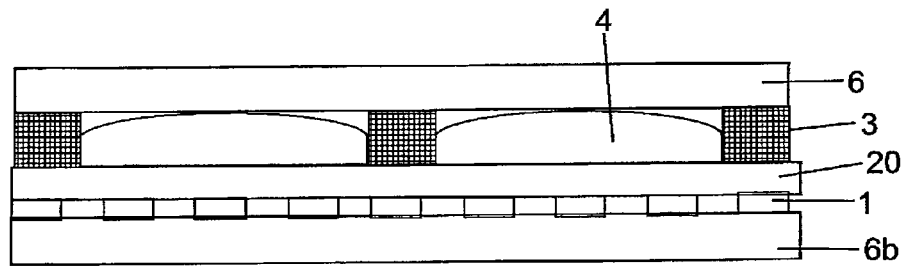
FIG. 9a shows a parallax optic formed between the image display's substrates comprising a lens array and a non-transmitting parallax barrier.
Figure 9B:
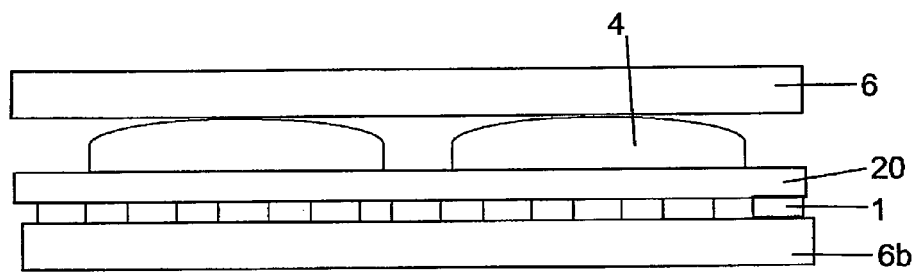
FIG. 9b shows a parallax optic formed between the image display's substrates comprising a lens array.
Figure 9C:
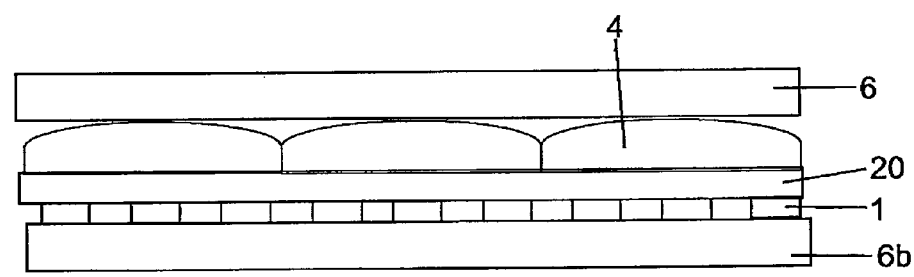
FIG. 9c shows a parallax optic formed between the image display's substrates comprising a closed packed lens array.
Figure 9D:
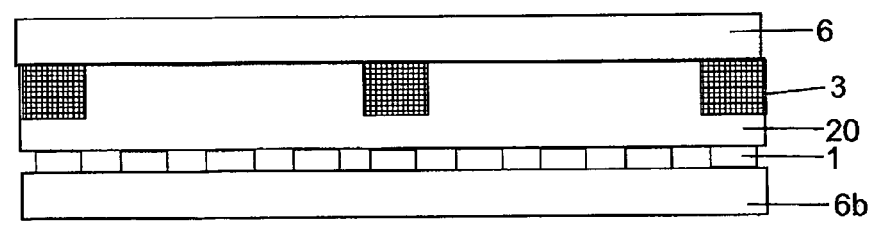
FIG. 9d shows a parallax optic formed between the image display's substrates comprising a non-transmitting parallax barrier.

FIG. 7a shows a parallax optic 2 comprised of an array of lens elements 4 whereby the spaces between the lens elements are filled with a non-transparent material 3. This arrangement forms a parallax barrier where each parallax element comprises an aperture containing a lens. FIG. 7b shows a parallax optic comprised of an array of lens elements 4 that has transparent regions between the lens elements. FIG. 7c shows a parallax optic comprised of a close packed array of lens elements 4. FIG. 7d shows a parallax optic comprised of a periodic array of non-transmissive regions formed from a non-transparent material 3.

FIG. 8 illustrates various types of parallax optic 2 that may be formed directly onto the substrate 6 of the pixellated display 9 in order to realise a display 22 capable of multiple image functions as depicted in FIG. 5b. FIG. 8a shows a parallax optic 2 comprised of an array of lens elements 4 whereby the spaces between the lens elements are filled with a non-transparent material 3. FIG. 8*b* shows a parallax optic comprised of an array of lens elements 4 that has transparent regions between the lens elements 4. FIG. 8*c* shows a parallax optic comprised of a close packed array of lens elements. The lens elements shown in FIG. 8*a*, FIG. 8*b* and FIG. 8*c* may be formed directly into the substrate 6 via an etching process or a moulding process. FIG. 8*d* shows a parallax optic comprised of a periodic array of non-transmissive regions formed from a non-transparent material 3.

FIG. 9 illustrates various types of parallax optic 2 that that may be formed between substrate 6 and substrate 6*b* of the pixellated display 9 in order to realise a display 22 capable of multiple image functions as depicted in FIG. 6*b*. FIG. 9*a* shows a parallax optic 2 comprised of an array of lens elements 4 whereby the spaces between the lens elements are filled with a non-transparent material 3. FIG. 9*b* shows a parallax optic comprised of an array of lens elements 4 that has transparent regions between the lens elements. FIG. 9*c* shows a parallax optic comprised of a close packed array of lens elements 4. FIG. 9*d* shows a parallax optic comprised of a periodic array of non-transmissive regions formed from a non-transparent material 3. In all examples of FIG. 9(*a-d*), a transparent planarisation layer 20 may be used to planarise the parallax optic and to space the parallax optic away from the pixels 1 by a predetermined amount. The planarisation layer may be fabricated from SU-8 2050 (MicroChem).

Figure 10B:
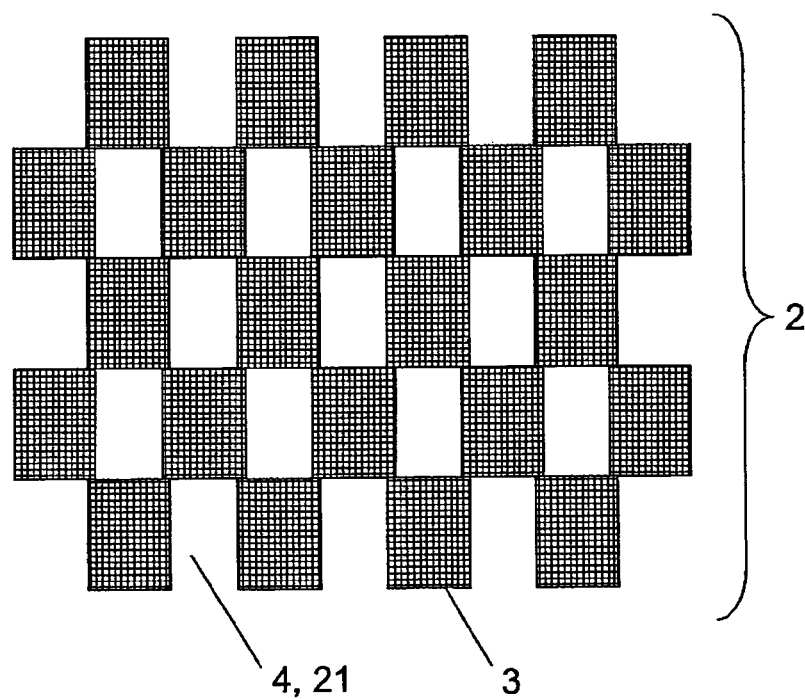
FIG. 10b shows a parallax optic consisting of a chequerboard arrangement of optical elements.

FIG. 10*a* illustrates how a parallax optic, comprised of an array of lens elements 4, 21 and non-transparent material 3, may be fabricated into a structure that is periodic in one dimension only. The lens elements 4 may be cylindrical to provide cylindrical convergence. FIG. 10*b* illustrates how a parallax optic, comprised of an array of lens elements 4, 21 and non-transparent material 3, may be fabricated into a structure that is periodic in two dimensions and forms a chequerboard configuration. The lens elements 4 may be cylindrical or spherical. For the same area coverage of non-transparent material, the chequerboard configuration in FIG. 10*b* is less visible and produces less unwanted image artefacts than the arrangement shown in FIG. 10*a*.

FIG. 11*a* illustrates how a parallax optic, comprised of an array of spherical lens elements 4 and non-transparent material 3, may be fabricated into a structure that is periodic in two dimensions. The lens elements in FIG. 11*a* are capable of focusing light to a point. FIG. 11*b* illustrates how a parallax optic, comprised of an array of spherical lens elements 4 and non-transparent material 3, may be fabricated into a structure that is periodic in two dimensions. The lens elements in FIG. 11*b* are capable of focusing light to a point.

FIG. 12 illustrates how a parallax optic may be adhered to the substrate 6 of the pixellated display 9 in order to realise a display 22 capable of multiple image functions as depicted in FIG. 3*b*. FIG. 12*a* illustrates how the parallax optic may be adhered using a glue 8 or a glue like material 8*b*. In order for the lens array to perform an imaging function, the glue 8 or glue like material 8*b* in FIG. 12*a* must have a refractive index that is substantially different from the material that comprises the lenses. Gluing the parallax optic 2 to the pixellated display 9 creates a physically robust optical system. In order to increase the imaging power of the lenses, the glue layer depicted in FIG. 12*a* may be replaced with air. FIG. 12*b*, FIG. 12*c*, FIG. 12*d* and FIG. 12*e* illustrate how the parallax optic may be adhered to the substrate 6 such that an air 23 interface surrounds the lens substantially.

A display 22 capable of multiple image functions can be created from a pixellated display 9 regardless of the pixel layout configuration of the pixellated display 9. FIG. 13*a*, FIG. 13*b*, FIG. 13*c* and FIG. 13*d* illustrate some, but not an exhaustive list, of different pixel layout configurations that are compatible with a display 22 capable of multiple image functions. Red, green, blue and white pixels are shown at 24, 25, 26 and 27, respectively.

Figure 14:
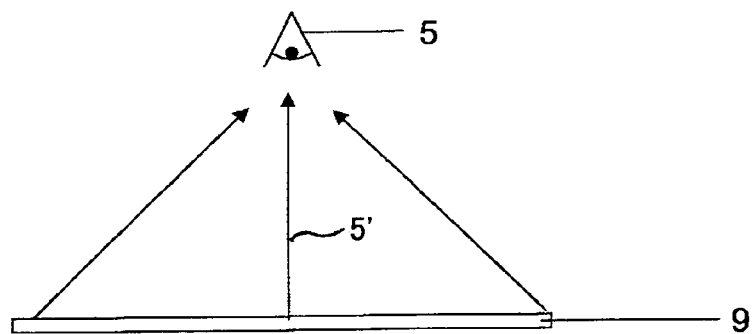
FIG. 14 shows a view point correction illustration for the display's user.

FIG. 14 illustrates that for a viewer 5 at a finite distance, the angular viewing function of pixels located at the centre of the pixellated display 9 must differ from the angular viewing function of pixels located at the periphery of the pixellated display 9. In order to facilitate different viewing functions for central pixels and peripheral pixels, the pitch of a parallax optic is required to be less than or equal to the pitch of the specific pixel arrangement (i.e. Pitch 2≧Pitch 1 for FIG. 15, FIG. 33 and FIG. 39). This is known as view point correction. Typically, αPitch 1=Pitch 2 where α takes values from 1 to 0.99.

Figure 21:
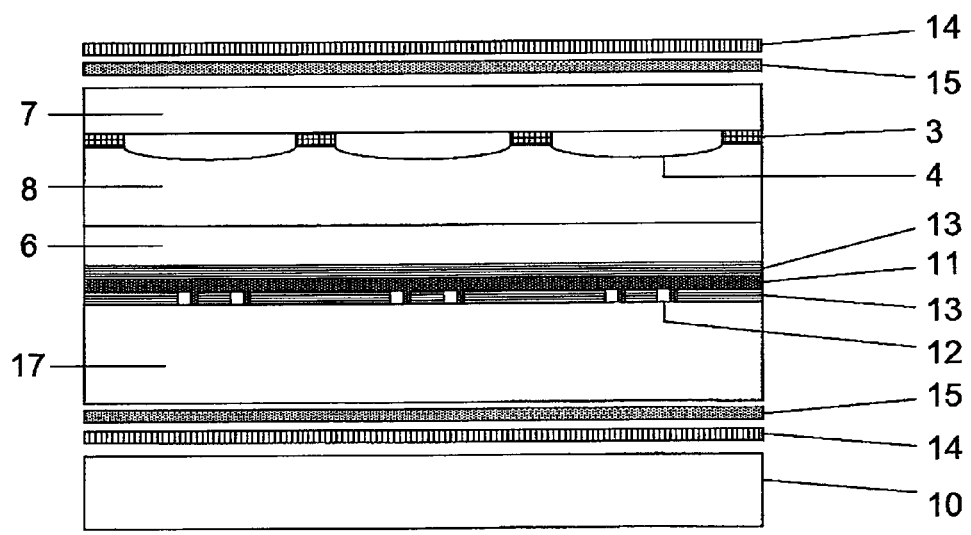
FIG. 21 shows a transmissive LCD with parallax optic sandwich between polarisers.

With reference to FIG. 21, the type of display used is a transmissive LCD having substrates 6 and 17, for example made of glass. The source of light is a backlight 10 that is placed on the opposite side of the display to the parallax optic 2. In this case, the image-forming layer is a thin layer of liquid crystal 11, which is addressed by TFTs 12 connected to transparent electrodes 13. In order to form an image, the liquid crystal layer must be sandwiched by a pair of polarisers 14 and the image quality is often improved by the use of compensation films 15 situated either side of the liquid crystal layer and inside the polariser. In this embodiment, the lens 4 and barrier 3 parallax optic is between the polarisers so that the order of optical elements from backlight to viewer is: polariser 14, compensation layer 15, liquid crystal layer 11, lens 4 and barrier arrangement 3, compensation layer 15, polariser 14.

Figure 22:
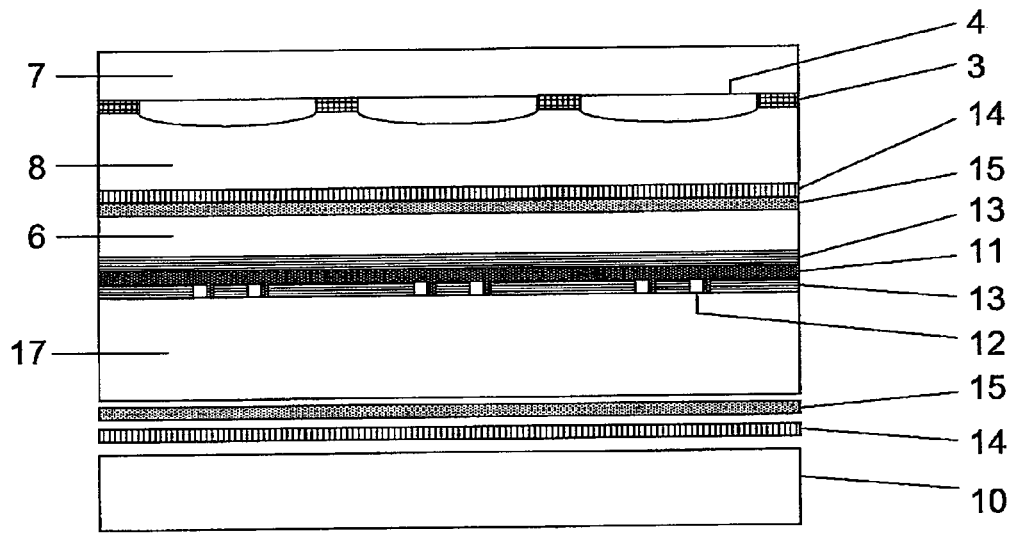
FIG. 22a shows a transmissive LCD with parallax optic situated outside of the laminated polarisers.
FIG. 22b shows a transmissive LCD with parallax optic situated outside of the in-cell polarisers.
Figure 22:
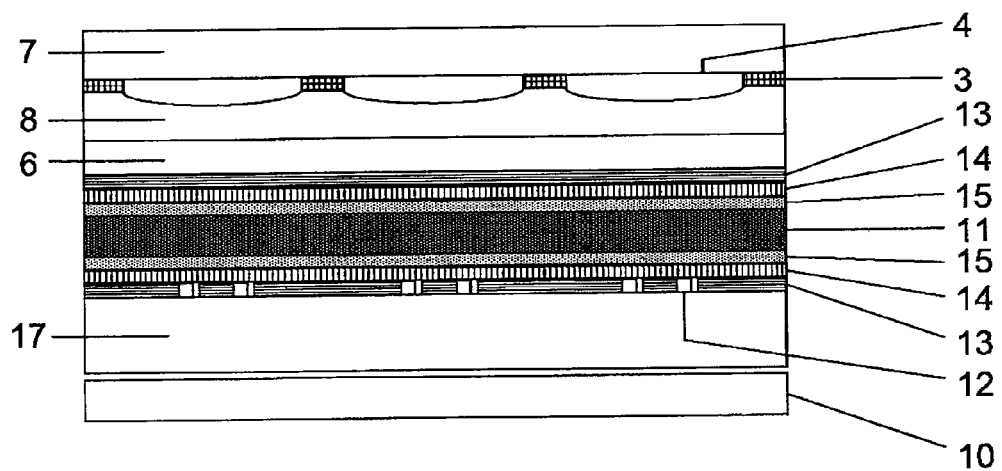

With reference to FIG. 22, a transmissive LCD is illustrated where the parallax optic 2 composed of a lens 4 and barrier 3 is situated outside of the polariser pair 14. The order of optical elements from backlight 10 to viewer is now: polariser 14, compensation layer 15, liquid crystal layer 11, compensation layer 15, polariser 14, lens 4 and barrier arrangement 3. The polarisers and compensation layers can be of the type that are laminated onto the glass substrates 6, 17 sandwiching the liquid crystal layer, as depicted in FIG. 22*a*. Alternatively, the polarisers and compensation layers may be of the in-cell variety so that they are situated between the glass plates and the liquid crystal layer as depicted in FIG. 22*b*. Alternatively, there could be any combination of in-cell optical elements (polarisers, compensations films) and laminatable optical elements (polarisers, compensations films).

Figure 23:
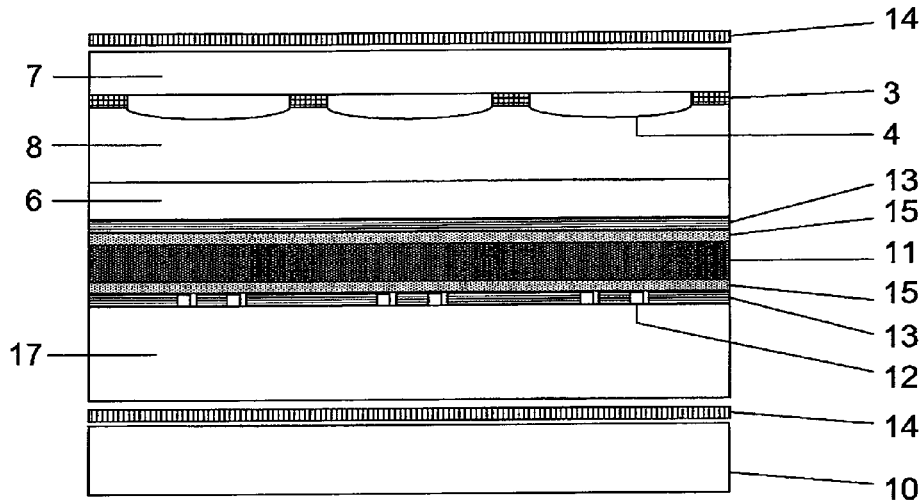
FIG. 23 shows a transmissive LCD with parallax optic and compensation layers situated on one side only.

With reference to FIG. 23, the type of display used is a transmissive LCD. In this case, the polarisers 14 are located either side of the lens 4 and barrier 3, but the compensation layers are both on one side of the lens and barrier arrangement, as shown in FIG. 23. Again, the compensation layers 15 can be positioned either outside of the glass substrates or adjacent the liquid crystal layer 11. The polarisers 14 form "outer elements" of the display and the parallax optic formed by the barrier 3 and lenses is disposed between these outer elements.

Figure 24:
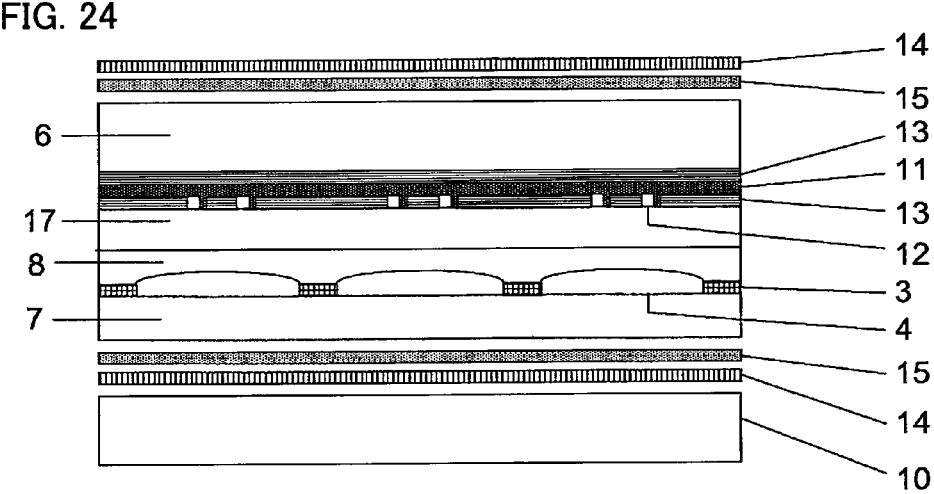
FIG. 24 shows a transmissive LCD with parallax optic located next to the backlight.

With reference to FIG. 24, the type of display used is a transmissive LCD where the parallax optic 2 composed of a lens 4 and barrier 3 is situated between the backlight and the LCD.

Figure 25:
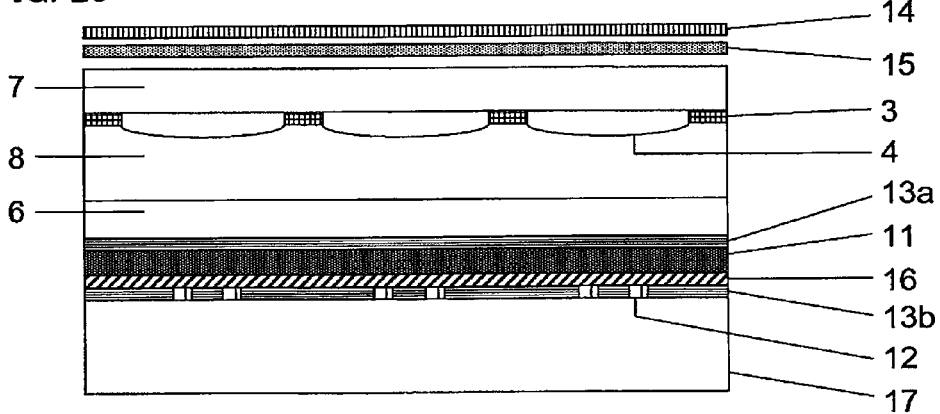
FIG. 25 shows a reflective LCD with parallax optic.

With reference to FIG. 25, the type of display used is a reflective LCD. The source of light here is the ambient light, which passes through the front polariser 14, then the optional compensation layer 15, then the lens 4 plus barrier 3 forming the parallax optic 2 and the liquid crystal layer 11, before being reflected from a reflector 16, and then returning back through the optical system (liquid crystal layer to parallax optic to polariser). In FIG. 25, the reflector 16 is positioned above the electrode 13b. The reflector 16 may be positioned below electrode 13a or on the outside surface of substrate 17.

Figure 26A:
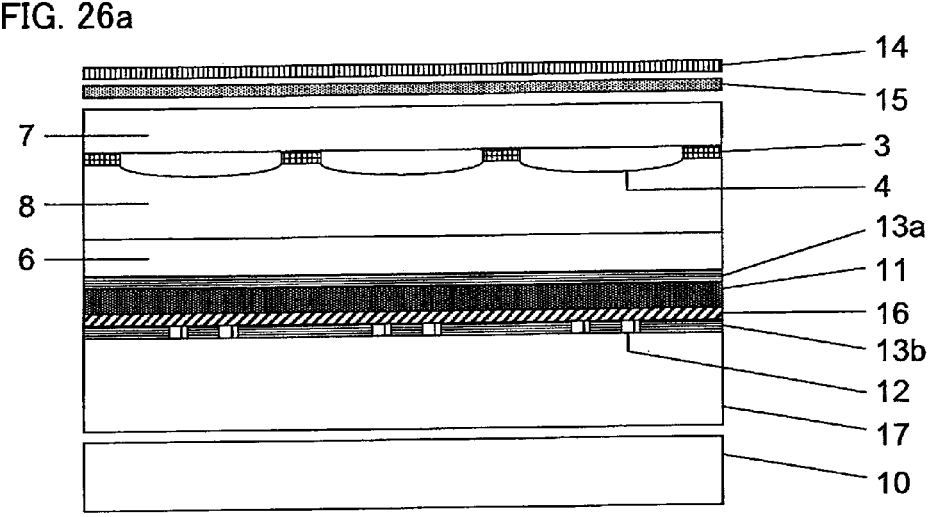
FIGS. 26a and 26b show a transflective LCD with parallax optics.
Figure 26B:
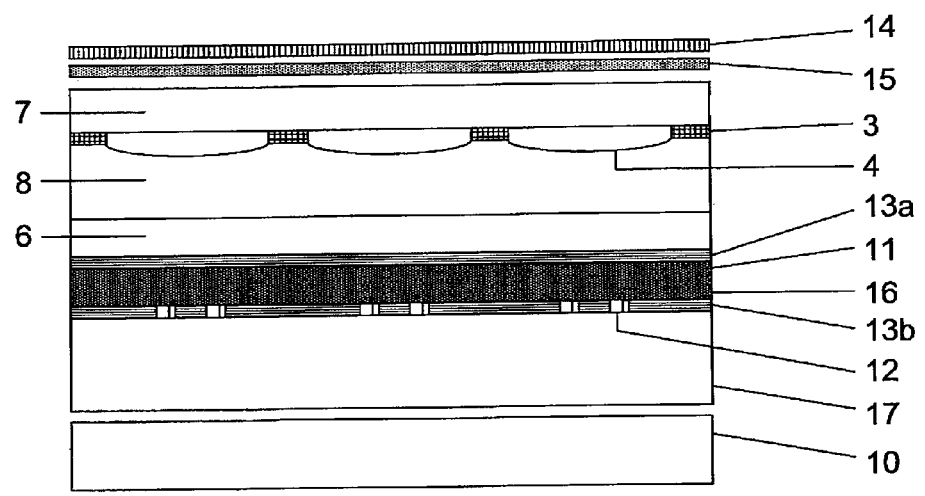

With reference to FIG. 26, the type of display used is a transflective LCD, in which each pixel of the display has both transmissive and reflective portions. FIG. 26 illustrates that the transmissive region and reflective region of each pixel may occur along the symmetry axis of the lenses. FIG. 26a shows a cross-section of the device within a reflective portion, and FIG. 26b shows a cross-section within a transmissive portion.

Figure 27:
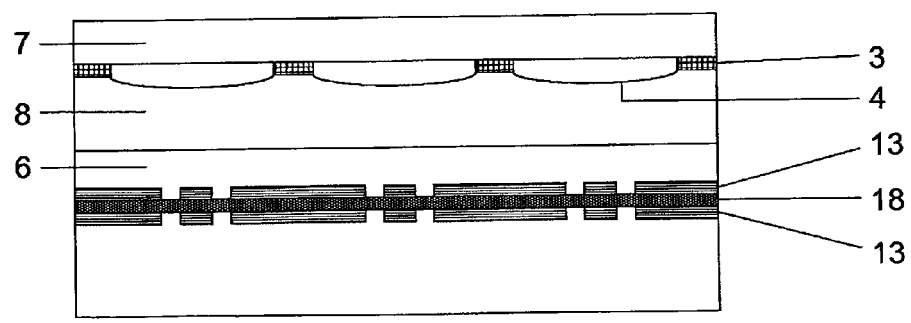
FIG. 27 shows a display that does not use polarisers to form an image with parallax optics.

With reference to FIG. 27, a further embodiment of the invention uses a display that does not use polarisation optics in order to form an image. FIG. 27 illustrates an image-forming layer 18 which may be an electrophoretic layer or an organic light emitting diode (OLED) layer or a light emitting diode (LED) layer or plasma display layer or a field effect device (FED) layer or surface-conduction electron-emitter (SED) layer or a phosphorous layer.

Figure 28A:
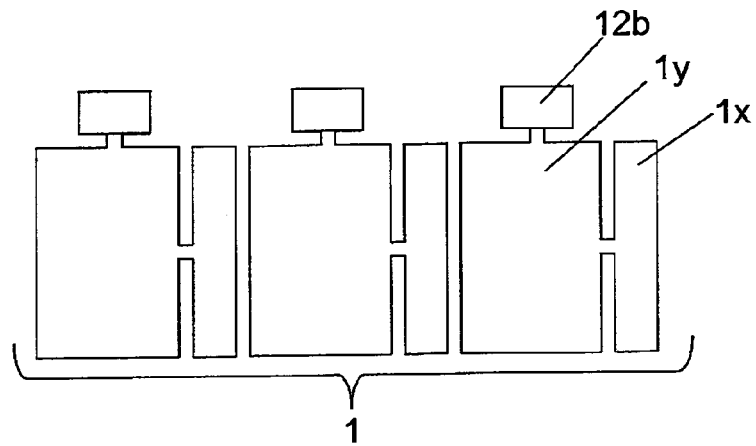
FIG. 28a shows a plan view of an anode arrangement for an OLED display.
Figure 28B:
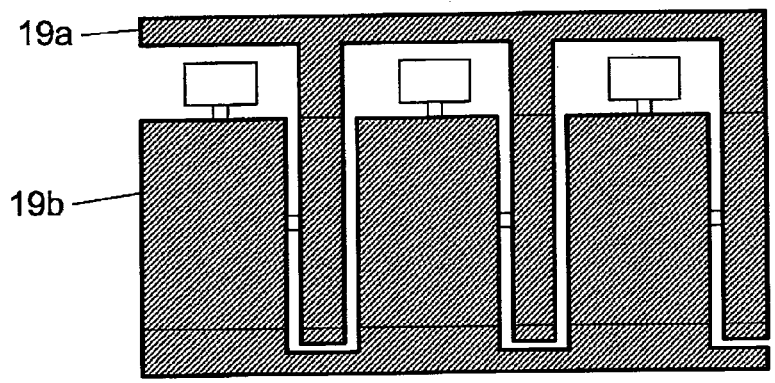
FIG. 28b shows a plan view of a cathode arrangement for an OLED display.
Figure 28C:
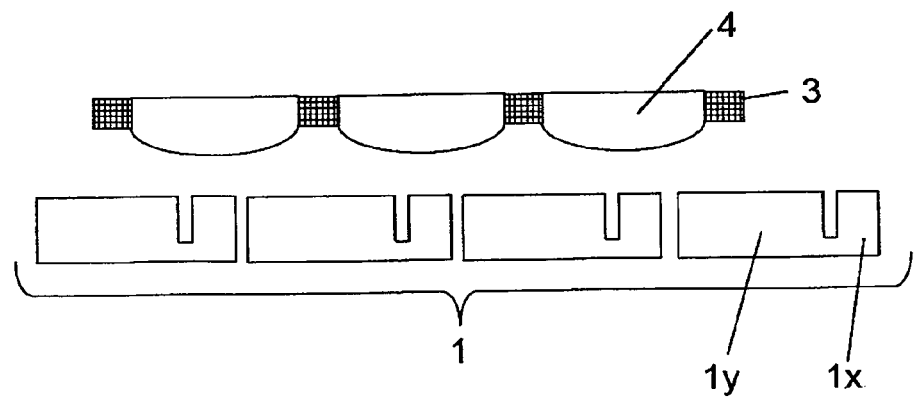
FIG. 28c shows a side view of an OLED display showing a parallax optic and pixels.

With reference to FIG. 28a, FIG. 28b and FIG. 28c, a further embodiment of the invention utilises a display that only operates in either reverse or forward bias, for example an LED or OLED display. The example of an OLED display will be used here to illustrate the concept of this embodiment of the invention. A plan view of an electrode, which may be an anode, and electrical switch arrangement is illustrated in FIG. 28a whereby each pixel is comprised of two regions, 1x and 1y. A voltage V1 is applied to regions 1x and 1y. The lateral extent of 1x and 1y may be the same but a preferred lateral extent for region 1y is approximately 2 to 4 times wider than the lateral extent of region 1x.

A plan view of an electrode arrangement, which may be a cathode, is illustrated in FIG. 28b whereby the pixel regions 1x and 1y as illustrated in FIG. 28a are situated directly beneath the electrodes 19a and 19b respectively. Voltages $V_2$ and $V_3$ are independently applied to electrode 19a and 19b, respectively.

A side view of a display with pixel regions 1x and 1y and the relative positioning of a parallax optic to provide angularly dependent viewing windows for regions 1x and 1y is illustrated in FIG. 28c. In the case of an OLED display that is operated in forward bias, it is possible to address both pixel regions 1x and 1y with the same electrical switch 12b, for example, an arrangement of Thin Film Transistors (TFTs) that provides the necessary current for the OLED emission. In order to turn on regions 1x and 1y, $V_2$ and $V_3$ are set to be sufficiently different from $V_1$ such that the diode light emission threshold is crossed and light emission occurs.

In order to turn off regions 1y, $V_3$ is set to be sufficiently different from $V_1$ such that the diode light emission threshold is not crossed and light emission does not occur. By changing from a situation where pixel regions 1x and 1y are emitting light to a situation where only region 1x is emitting light, the viewing angle of the display will be changed from wide to narrow (public to private) owing to the imaging function provided by the parallax optic as shown in FIG. 28c. The advantage of this system is that, because the same data is applied to pixel region 1x and 1y, only 1 electrical switch is required to control the both regions 1x and 1y. By patterning the opposite electrode 19a, 19b to coincide with pixel regions 1x and 1y and controlling the voltage applied to 19a and 19b independently, it is possible to choose whether to display the TFT data on pixel region 1x or 1y or both regions or neither region. This driving technique works for an LED or OLED display because it requires forward bias, but could not be used (for example) in a nematic LCD because this responds to both positive and negative voltage. However, it may be of use in bistable or polar LCDs (such as ferroelectric or flexoelectrics) that switch depending on the sign of the applied voltage for their addressing.

Methods as described in US20070146236A1 may be applied to increase the brightness of multiple image function displays. Methods as described in GB 2445982 may be applied to enhance to image quality of multiple image function displays.

Another function (such as an output feature) of the display, or of a device or apparatus incorporating the display, may be controlled simultaneously according to the image display function or mode. For example, the volume of a sound setting may be changed when the display is changed between a public mode and a private mode.

A given image display function (for example, the public mode) may be changed to a different image display function (for example, a private mode) by a user by means of a manual input arrangement, for example, a touchscreen, a dedicated control button, a voice recognition input or a gesture recognition input. A given image display function (for example, the public mode) may be changed to a different image display function (for example, a private mode) by a predefined automated process.

Figure 32:
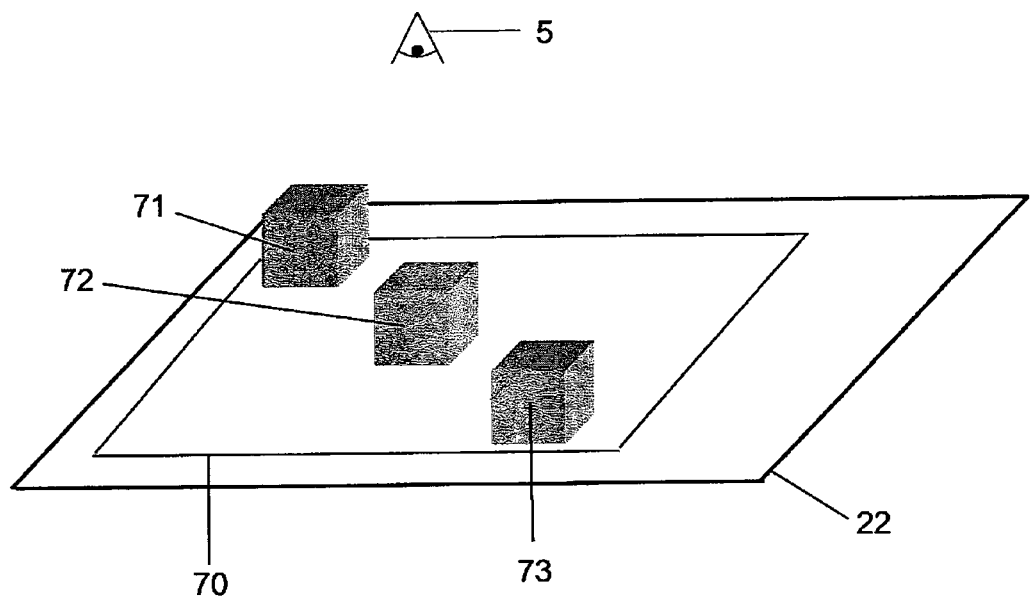
FIG. 32 shows a display with a window showing 3D buttons.

With reference to FIG. 32, a 3D touch button application 70 may be realised for data input. A multiple image function display 22 that is capable of a 3D mode 41 for an on-axis user 5 includes an image generator or cooperates with an image generator to display an image of a button or buttons that have a 3D appearance. The top surface of the 3D button image can be contrived to appear substantially above the plane of the display 71 or substantially in the plane of the display 72 or substantially below the plane of the display 73. Via an input device, such as, for example, a mouse, a touchscreen, a gesture recognition unit etc. a user can interact with the 3D button in order to invoke an action. Upon interaction with a specific 3D button, the image generator alters the 3D button image, to change the perceived depth position of the image. For example, the plane in which the top of the 3D button substantially appears in is changed i.e. the top of the 3D button appears substantially in a different plane once, an interaction has been registered. Changing the plane in which the top of the 3D button substantially appears provides a visual confirmation to the user that the interaction process with the 3D button has been registered and information has been successfully input. If the multiple image function display 22 is equipped with a touch sensor that has a proximity detection capability, then the user can interact with a 3D button without physically touching the multiple image function display 22. This has the advantage of keeping the multiple image function display 22 free from fingerprints that tend to degrade the image quality.

Figure 33:
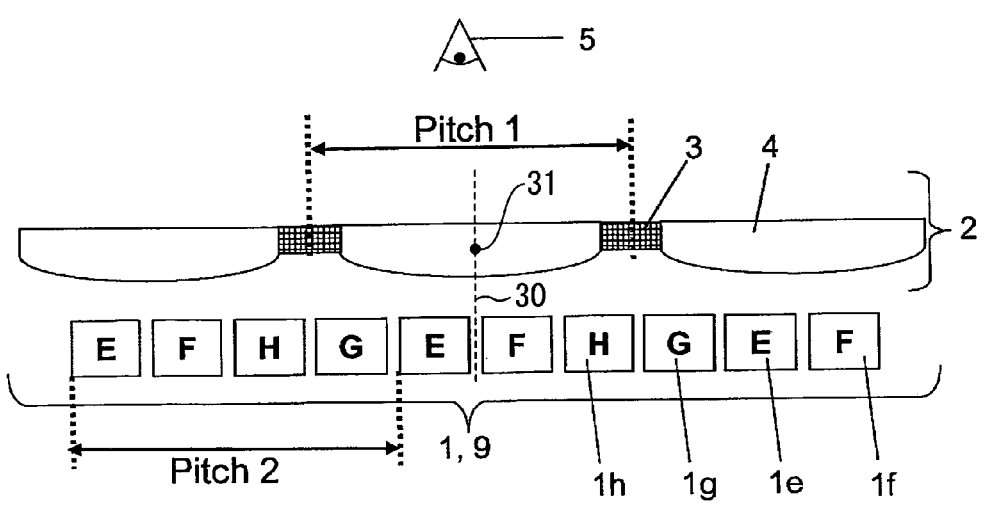
FIG. 33 shows a directional display consisting of a parallax optic and a pixellated display.

An embodiment outlined schematically in FIG. 33 comprises a parallax optic 2 and display 9, as detailed in FIG. 3b. The parallax optic is formed according to FIG. 7a, and comprises of an array of lens elements 4 whereby the spaces between the lens elements are filled with a non-transparent material 3. Alternative parallax optic options are illustrated in FIGS. 7b, c and d. The parallax optic 2 in FIG. 33 has a pitch (Pitch 1) that is substantially the same as the pitch of four pixels (Pitch 2) of the display 9. Pitch 2 incorporates first to fourth pixels of pixel types E, F, G and H, respectively. Pixels types E, F, G and H may be white pixels. Pixels types E, F, G and H may be colour sub-pixels. The lens 4 apex is centred symmetrically about pixel types E and F. In particular, the first and second pixels of types E and F are disposed on opposite sides of a plane 30 containing a centre line 31 of the lens 4 and extending substantially perpendicularly to the parallax optic 2. The third and fourth pixels of types G and H are disposed on opposite sides of the first and second pixels, respectively, from the plane 30.

Satisfactory imaging performance was found to occur when the ratio of the width of the non-transparent material (barrier) to the pitch of the parallax optic (Pitch 1) was between 0% and 40%, with a preferred value of around 20%. A large barrier width to lens width ratio results in good imaging capabilities. However, if the ratio is too large, image artefacts arise from the fact that the barrier becomes visible. Therefore a barrier width must be selected that is substantially unobtrusive for the viewer but achieves sufficient imaging results. A barrier arranged in a chequerboard configuration (FIG. 10*b*) provides less visible image artefacts than a one dimensional barrier configuration (FIG. 10*a*). Preferred performance was found using a barrier width of 30 µm, a lens width of 120 µm, a lens height of 40 µm and a lens with a radius of curvature of 65 µm. A distance equal to the thickness of the substrate 6 separates the apex of the lens from the pixel layer. Satisfactory imaging performance was found to occur when the thickness of substrate 6 was varied between 30 µm and 200 µm. Preferred performance was found to occur when the thickness of substrate 6 was around 75 µm. The preferred imaging performance was found to occur when the parallax optic was adhered to the pixellated display according to FIG. 12*d*.

Figure 34A:
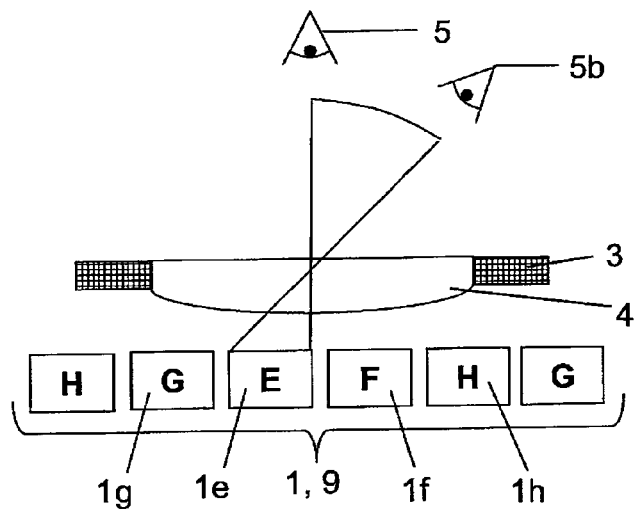
FIG. 34a shows a viewing window of pixel 1e.
Figure 34B:
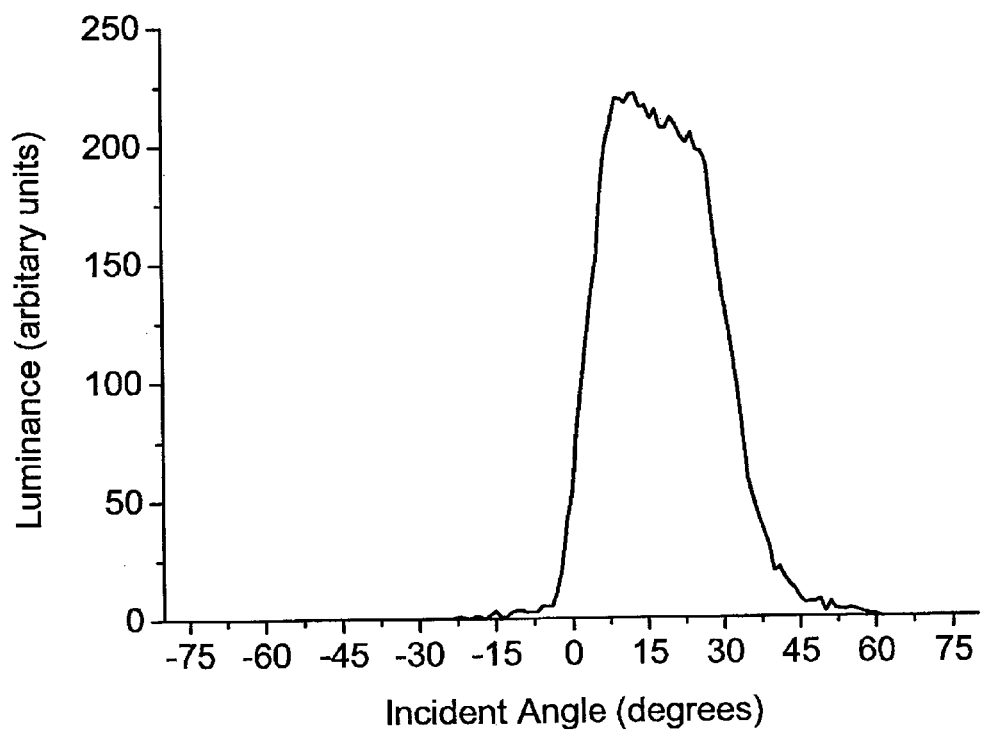
FIG. 34b shows a modelled angular response of luminance for pixel 1e.

The angular dependent viewing window of pixel type E is illustrated schematically in FIG. 34*a* and modelled exactly in FIG. 34*b* according to the details of the preferred imaging conditions detailed above. Pixel type E substantially provides an image viewable on-axis by viewer 5 and off-axis to the left by viewer 5*b* of the display 9.

Figure 35A:
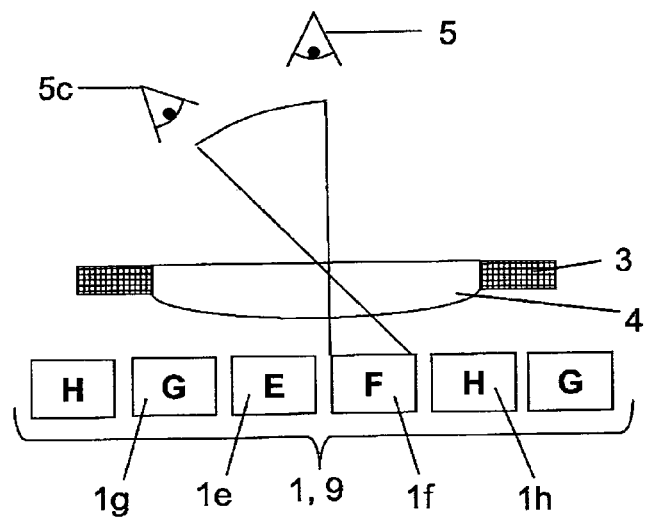
FIG. 35a shows a viewing window of pixel 1f.
Figure 35B:
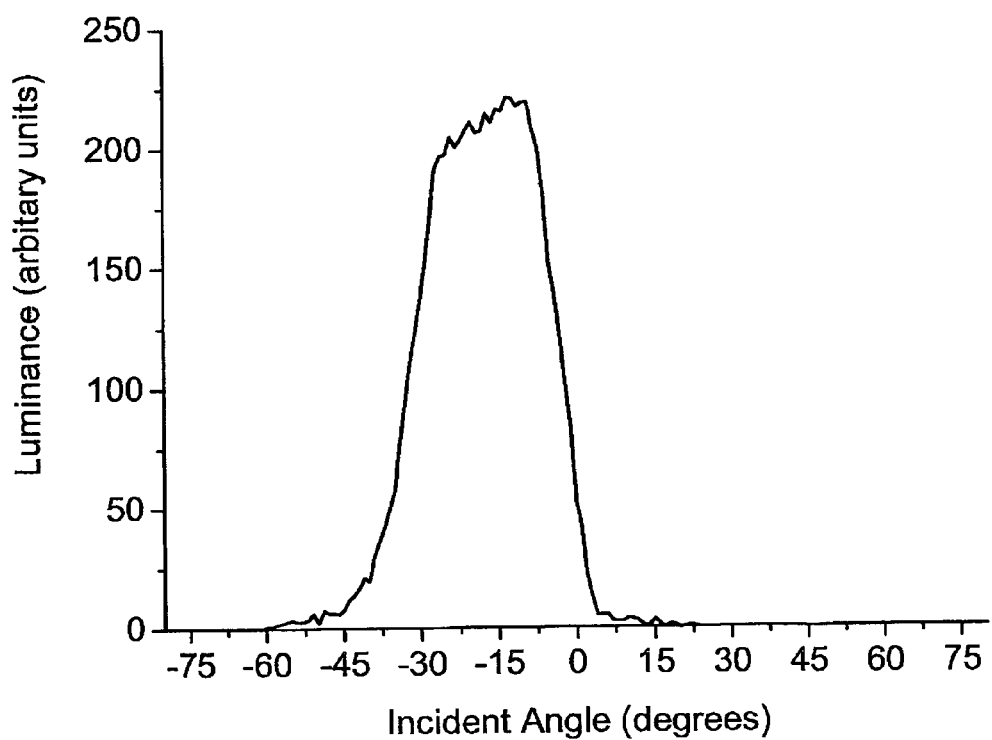
FIG. 35b shows a modelled angular response of luminance for pixel 1f.

The angular dependent viewing window of pixel type F is illustrated schematically in FIG. 35*a* and modelled exactly in FIG. 35*b* according to the details of the preferred imaging conditions detailed above. Pixel type F substantially provides an image viewable on-axis by viewer 5 and off-axis to the right by viewer 5*c* of the display 9.

Figure 36A:
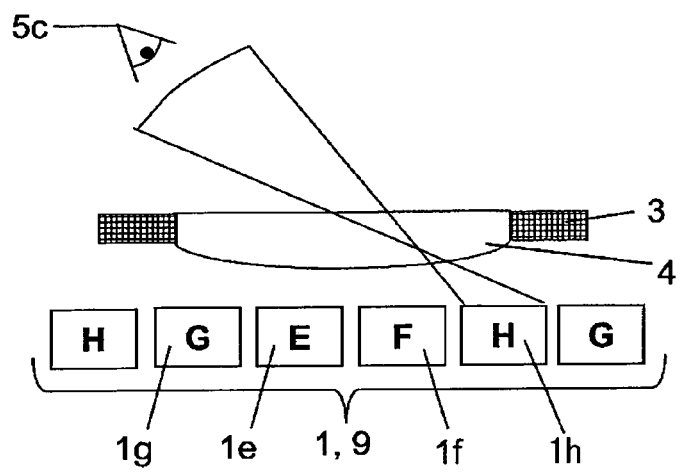
FIG. 36a shows a viewing window of pixel 1h.
Figure 36B:
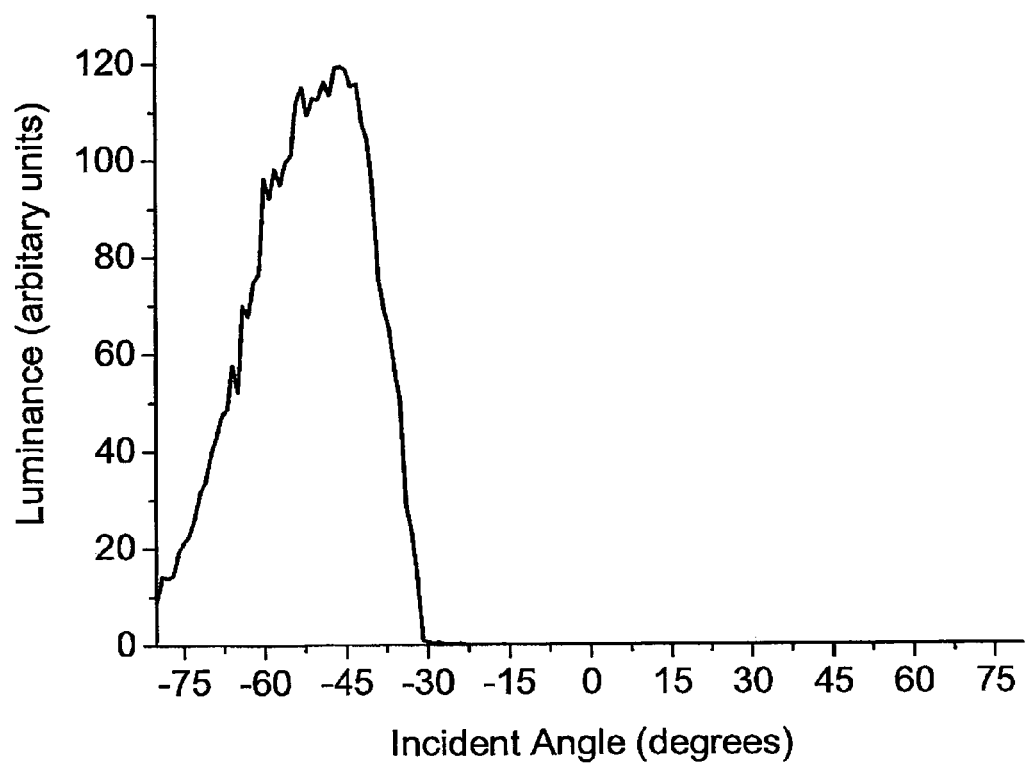
FIG. 36b shows a modelled angular response of luminance for pixel 1h.

The angular dependent viewing window of pixel type H is illustrated schematically in FIG. 36*a* and modelled exactly in FIG. 36*b* according to the details of the preferred imaging conditions detailed above. Pixel type H substantially provides an image viewable off-axis to the right by viewer 5*c* of the display 9.

Figure 37A:
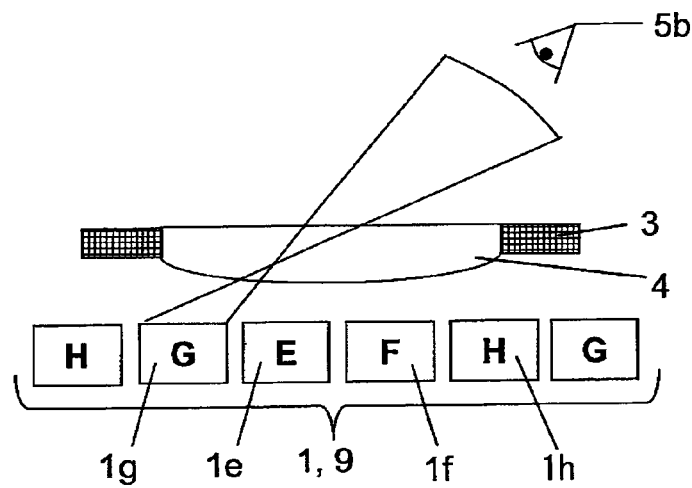
FIG. 37a shows a viewing window of pixel 1g.
Figure 37B:
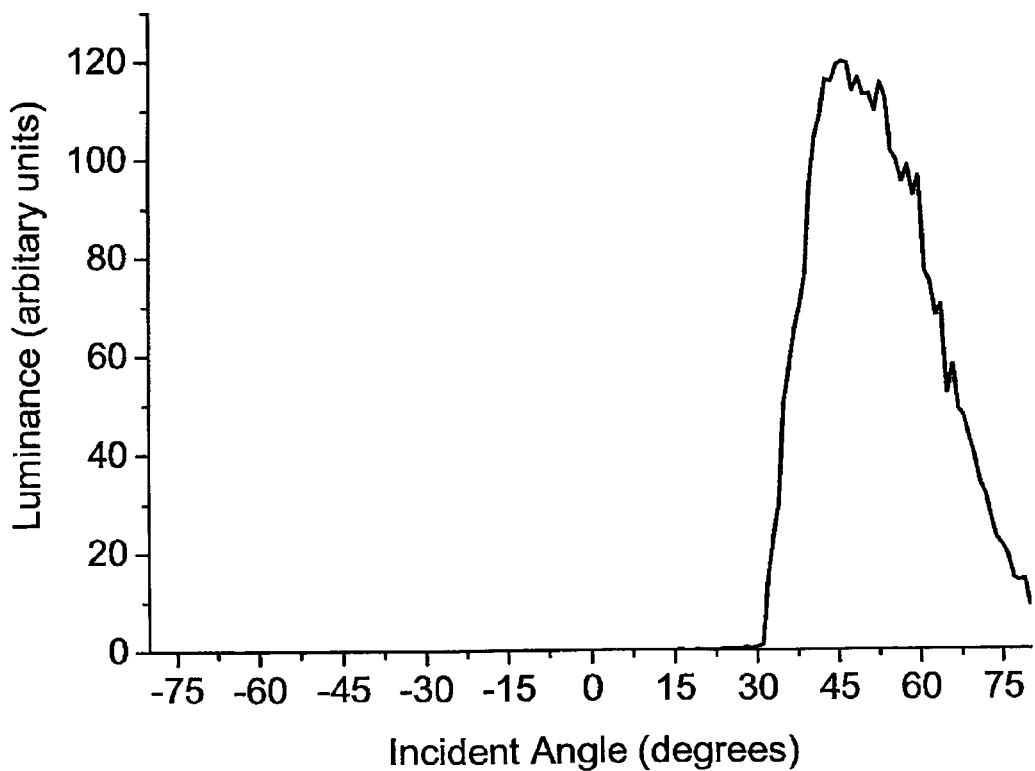
FIG. 37b shows a modelled angular response of luminance for pixel 1g.

The angular dependent viewing window of pixel type G is illustrated schematically in FIG. 37*a* and modelled exactly in FIG. 37*b* according to the details of the preferred imaging conditions detailed above. Pixel type G substantially provides an image viewable off-axis to the left by viewer 5*b*. Undesirable image artefacts can be minimised by arranging pixel types E, F, G and H to produce the same colour in any given row and/or column.

Figure 38A:
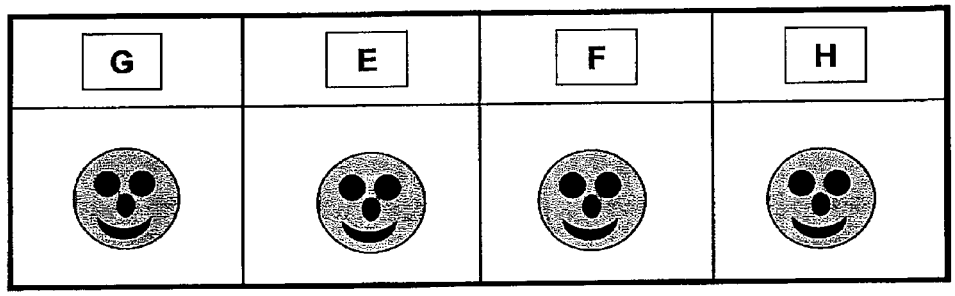
FIG. 38a shows image addressing to pixels that yields a public, wide view mode.
Figure 38B:
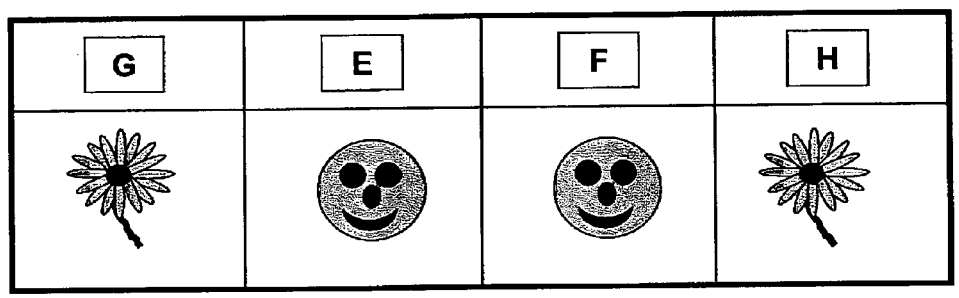
FIG. 38b shows image addressing to pixels that yields a strong privacy mode.

The use of a parallax optic 2 and a pixellated display 9 as illustrated in FIG. 33 realises a display capable of multiple image functions. In order to actually achieve the multiple image functionality, it is necessary to address images to the pixellated display in a predetermined way. More specifically, different images must be spatially interlaced in a predefined way. A method of addressing images to the pixel types E, F, G and H for the embodiment outlined in FIG. 33 is shown in FIGS. 38*a-e*. FIG. 38*a* illustrates that, by addressing pixel types E, F, G and H with the same image (a face), a wide angle view public mode is achieved (i.e. the smiley face is viewable from all directions). FIG. 38*b* illustrates that, by addressing pixel types E and F with a first image (a face) and addressing pixel types G and H with a second image (a flower) that is different to the first image, then a strong privacy mode is realised whereby the first image (a face) is substantially viewable on-axis by viewer 5 while the second image (a flower) is substantially viewable off-axis by viewers 5*b*, 5*c*.

Figure 38C:
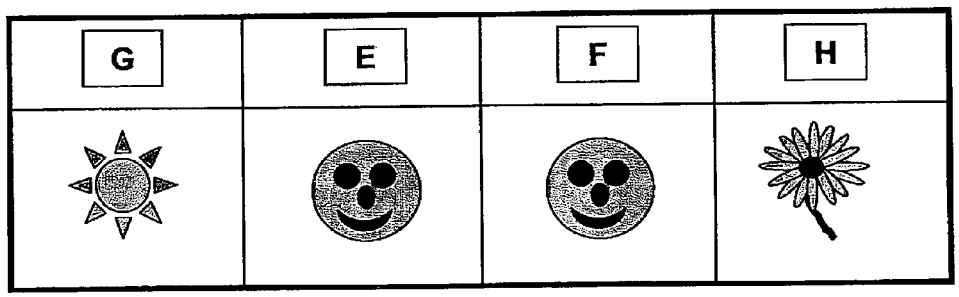
FIG. 38c shows image addressing to pixels that yields a strong privacy mode.

FIG. 38*c* illustrates that, by addressing pixel types E, F first image (a face), and addressing pixel type G with a second image (a sun), and addressing pixel type H with a third image (a flower), then a privacy mode is realised whereby the first image (a face) is substantially viewable on-axis by viewer 5 while the second image (a sun) is viewable off axis to the left by viewer 5*b* while the third image (a flower) is viewable off-axis to the right by viewer 5*c*. Thus, a degree of privacy for the on-axis first image (the face) is provided.

Figure 38D:
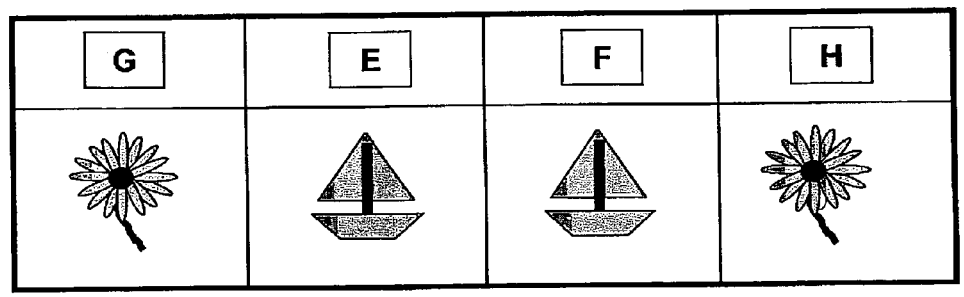
FIG. 38d shows image addressing to pixels that yields a strong privacy 3D mode.

FIG. 38*d* illustrates addressing pixel types E with a first image (a boat as observed by a person's left eye) and addressing pixel type F with a second image (a boat as observed by a person's right eye) then an autostereoscopic image of a boat is viewable on-axis. The first and second images are a "stereoscopic pair of images" and represent the images of the boat when viewed by each eye. By addressing pixel type G and H with a third image (a flower), a 3D privacy mode is realised whereby an autostereoscopic image of a boat is viewable on-axis and an image of a flower is observed off-axis.

Figure 38E:
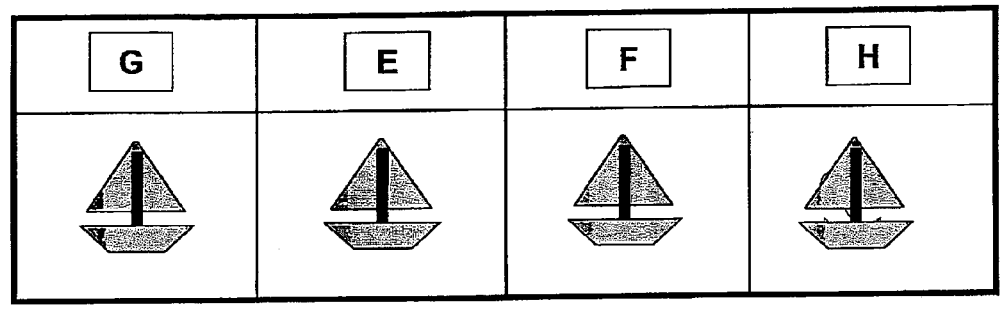
FIG. 38e shows image addressing to pixels that yields a 3D mode.

FIG. 38*e* illustrates addressing pixel type E with a first image (a boat as observed by a person's left eye) and addressing pixel type F with a second image (a boat as observed by a person's right eye) and addressing pixels types G and H with a third image (a non-stereoscopic image of a boat) then an autostereoscopic image of a boat is viewable on-axis while a non-autosteroscopic image of the same boat image is viewable off-axis.

Figure 39:
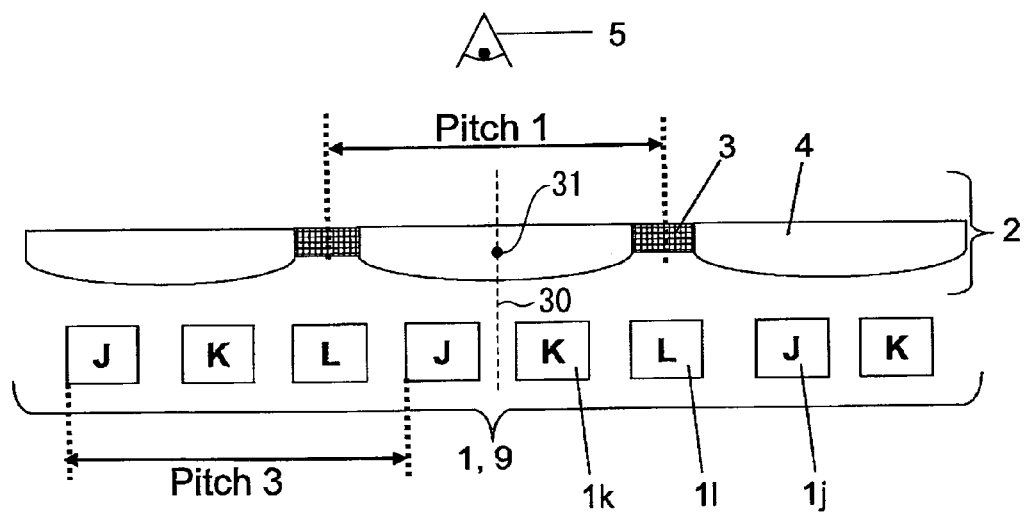
FIG. 39 shows a directional display consisting of a parallax optic and a pixellated display.

An embodiment outlined schematically in FIG. 39 comprises a parallax optic 2 and display 9, as detailed in FIG. 3*b*. The parallax optic is formed according to FIG. 7*a*, and comprises of an array of lens elements 4 whereby the spaces between the lens elements are filled with a non-transparent material 3. Alternative parallax optic options are illustrated in FIGS. 7*b*, *c* and *d*. The parallax optic 2 in FIG. 39 has a pitch (Pitch 1) that is substantially the same as the pitch of three pixels (Pitch 3) of the display 9. Pitch 3 incorporates first to third pixels of pixel types J, K and L, respectively. Pixels types J, K and L may be white pixels. Pixels types J, K and L may be colour sub-pixels. The lens 4 apex is centred symmetrically about pixel types J and K. In particular, the first and second pixels of types J and K are disposed on opposite sides of the plane 30 and the third pixels of type L are disposed on opposite sides of the first and second pixels from the plane 30. The third pixels, other than at the edge of the display, are shared by adjacent groups of the first to third pixels.

Satisfactory imaging performance was found to occur when the ratio of the width of the non-transparent material (barrier) to the pitch of the parallax optic (Pitch 1) was between 0% and 40%, with a preferred value of around 20%. A large barrier width to lens width ratio results in good imaging capabilities. However, if the ratio is too large, image artefacts arise from the fact that the barrier becomes visible. Therefore a barrier width must be selected that is substantially unobtrusive for the viewer but achieves sufficient imaging results. A barrier arranged in a chequerboard configuration (FIG. 10*b*) provides less visible image artefacts than a one dimensional barrier configuration (FIG. 10*a*). Preferred performance was found using a barrier width of 35 µm, a lens width of 113 µm, a lens height of 30 µm and a lens with a radius of curvature of 39 µm. A distance equal to the thickness of the substrate 6 separates the apex of the lens from the pixel layer. Satisfactory imaging performance was found to occur when the thickness of substrate 6 was varied between 30 µm and 200 µm. Preferred performance was found to occur when the thickness of substrate 6 was around 75 µm. The preferred imaging performance was found to occur when the parallax optic was adhered to the pixellated display according to FIG. 12d.

Figure 40A:
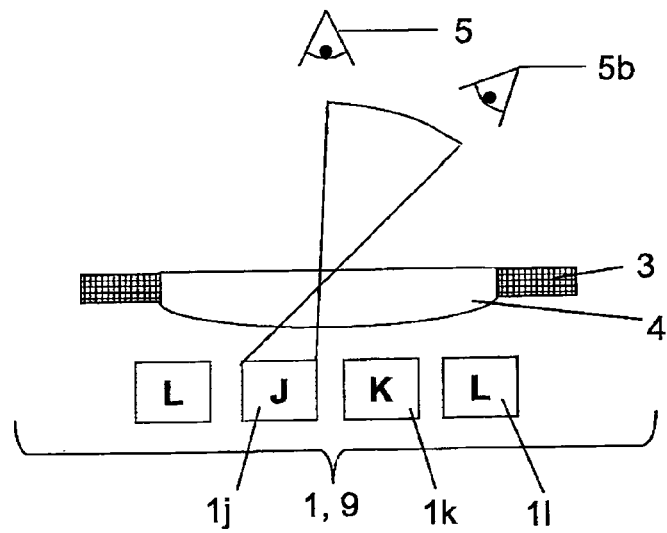
FIG. 40a shows a viewing window of pixel 1j.
Figure 40B:
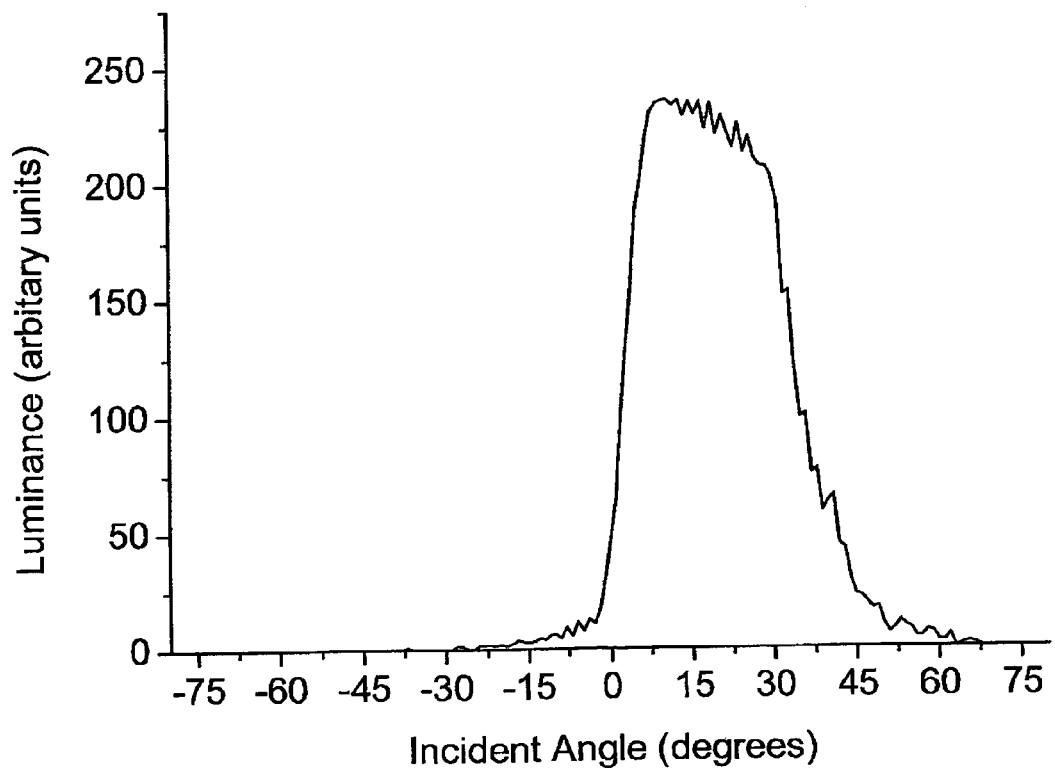
FIG. 40b shows a modelled angular response of luminance for pixel 1j.

The angular dependent viewing window of pixel type J is illustrated schematically in FIG. 40a and modelled exactly in FIG. 40b according to the details of the preferred imaging conditions detailed above. Pixel type J substantially provides an image viewable on-axis by viewer 5 and off-axis to the left by viewer 5b of the display 9.

Figure 41A:
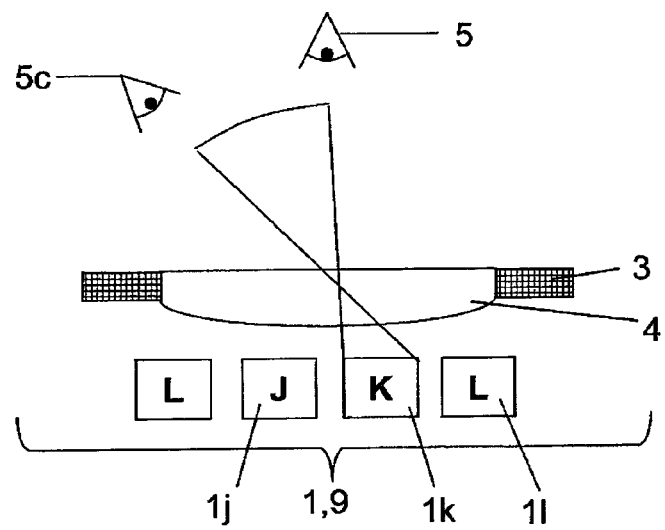
FIG. 41a shows a viewing window of pixel 1k.
Figure 41B:
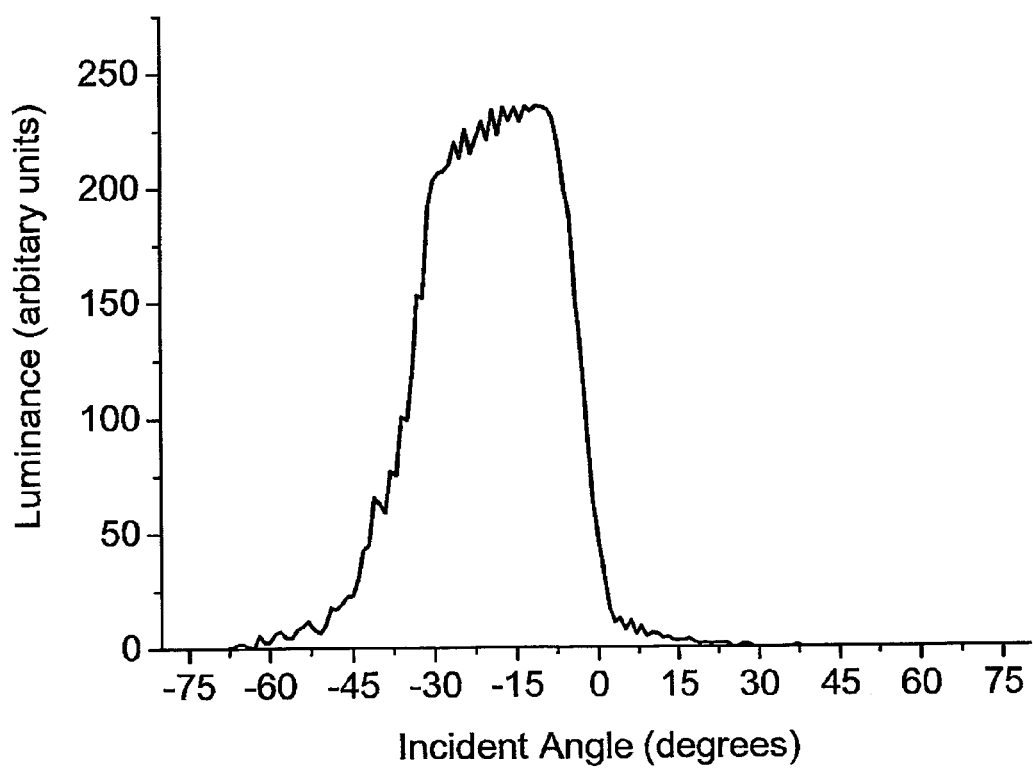
FIG. 41b shows a modelled angular response of luminance for pixel 1k.

The angular dependent viewing window of pixel type K is illustrated schematically in FIG. 41a and modelled exactly in FIG. 41b according to the details of the preferred imaging conditions detailed above. Pixel type K substantially provides an image viewable on-axis by viewer 5 and off-axis to the right by viewer 5c of the display 9.

Figure 42A:
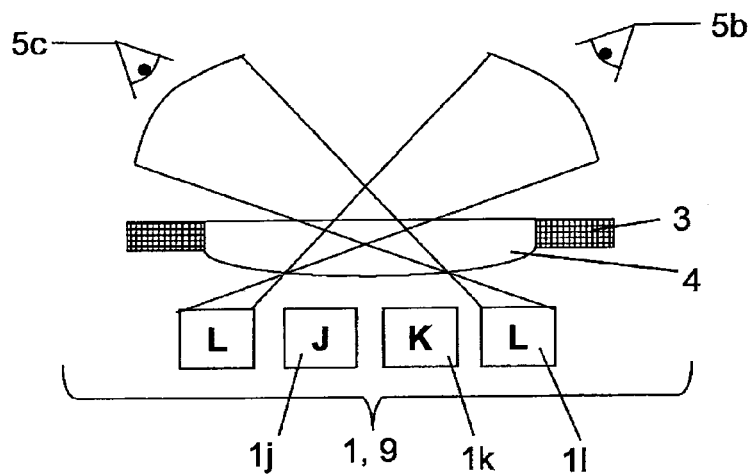
FIG. 42a shows a viewing window of pixel 1l.
Figure 42B:
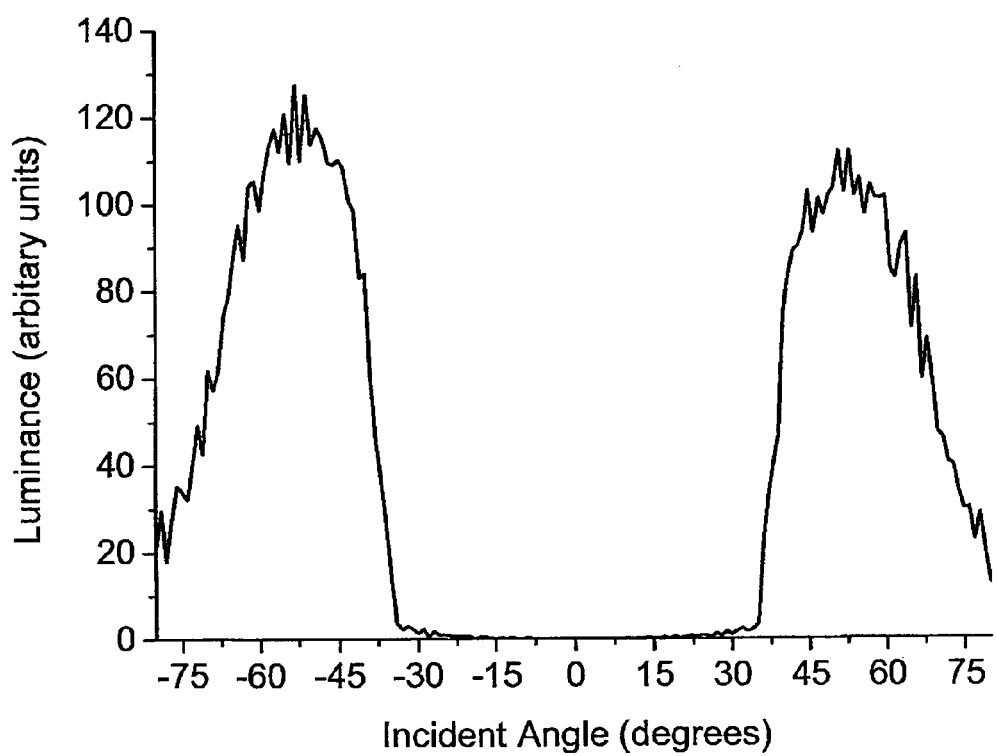
FIG. 42b shows a modelled angular response of luminance for pixel 1l.

The angular dependent viewing window of pixel type L is illustrated schematically in FIG. 42a and modelled exactly in FIG. 42b according to the details of the preferred imaging conditions detailed above. Pixel type L substantially provides an image viewable off-axis to the right by viewer 5c and off-axis to the left by viewer 5b of the display 9.

The use of a parallax optic 2 and a pixellated display 9 as illustrated in FIG. 39 realises a display capable of multiple image functions. In order to actually achieve the multiple image functionality, it is necessary to address images to the pixellated display in a predetermined way. More specifically, different images must be spatially interlaced in a predefined way. A method of addressing images to the pixel types J, K and L for the embodiment outlined in FIG. 39 is shown in FIGS. 43a-d.

Figure 43A:
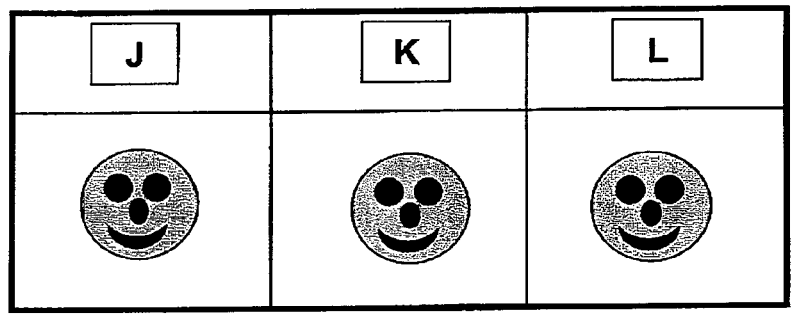
FIG. 43a shows image addressing to pixels that yields a public, wide view mode.

FIG. 43a illustrates that, by addressing pixel types J, K and L with the same image (a smiley face), a wide angle view public mode is achieved (i.e. the smiley face is viewable from all directions).

Figure 43B:
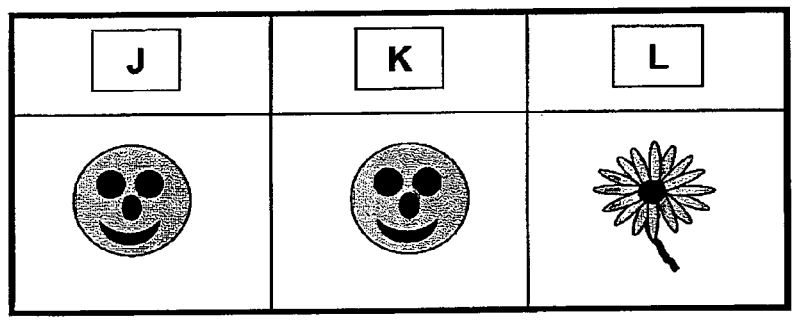
FIG. 43b shows image addressing to pixels that yields a strong privacy mode.

FIG. 43b illustrates that, by addressing pixel types J and K with a first image (a face) and addressing pixel type L with a second image (a flower) that is different to the first image, then a strong privacy mode is realised whereby the first image (a face) is substantially viewable on-axis by viewer 5 while the second image (a flower) is substantially viewable off-axis to the left by viewer 5b and off-axis to the right by viewer 5c.

Figure 43C:
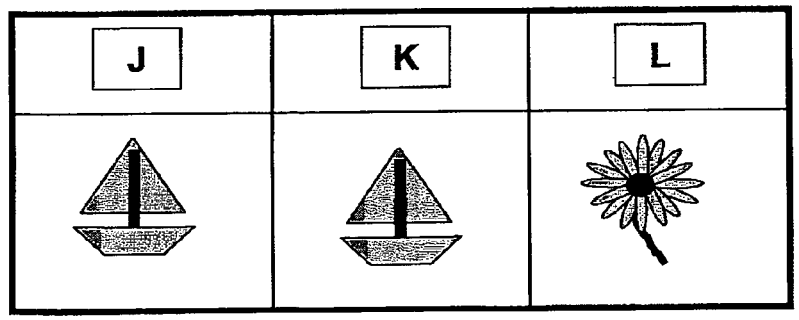
FIG. 43c shows image addressing to pixels that yields a strong privacy 3D mode.

FIG. 43c illustrates addressing pixel types J with a first image (a boat as observed by a person's left eye) and addressing pixel type K with a second image (a boat as observed by a person's right eye) then an autostereoscopic image of a boat is viewable on-axis. The first and second images are a "stereoscopic pair of images" and represent the images of the boat when viewed by each eye. By addressing pixel type L with a third image (a flower), a 3D privacy mode is realised whereby an autostereoscopic image of a boat is viewable on-axis and an image of a flower is observed off-axis.

Figure 43D:
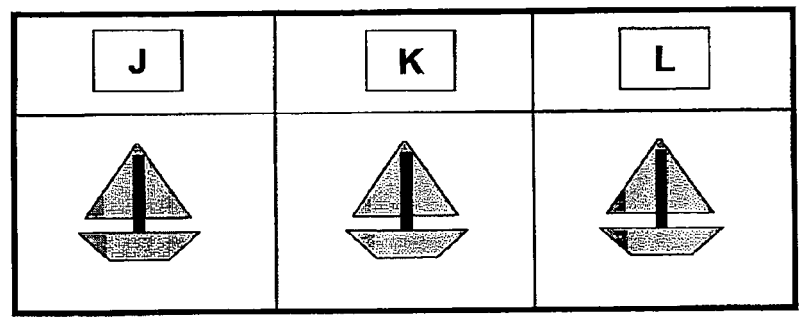
FIG. 43d shows image addressing to pixels that yields a 3D mode.

FIG. 43d illustrates addressing pixel type J with a first image (a boat as observed by a person's left eye) and addressing pixel type K with a second image (a boat as observed by a person's right eye) and addressing pixel type L with a third image (a non-stereoscopic image of a boat) then an autostereoscopic image of a boat is viewable on-axis while a non-autosteroscopic image of the same boat image is viewable off-axis.

With reference to FIG. 15, FIG. 17, FIG. 18 and FIG. 20m, an autostereoscopic 3D mode can be realised whereby a 3D image is perceived on-axis by viewer 5 while a 2D image is perceived off-axis by viewers 5b, 5c. With reference to FIG. 33, FIG. 34, FIG. 35, FIG. 38d and FIG. 38e, an autostereoscopic 3D mode can be realised whereby a 3D image is perceived on-axis by viewer 5 while a 2D image is perceived off-axis by viewers 5b, 5c. With reference to FIG. 39, FIG. 40, FIG. 41, FIG. 43c and FIG. 43d, an autostereoscopic 3D mode can be realised whereby a 3D image is perceived on-axis by viewer 5 while a 2D image is perceived off-axis by viewers 5b, 5c. Autostereoscopic 3D display systems, like those described above, that have a single viewing position for 3D images while all other viewing positions provide a 2D image, have the advantage that the user never experiences a "reverse 3D image". A reverse 3D image has the left eye image and the right eye image reversed so that the left eye image is seen by the right eye and vice versa. Reverse 3D images are a common problem for non-tracked autostereoscopic 3D displays and occur when the user moves their head laterally by an appreciable distance away from the correct 3D viewing position. Image flicking between a 3D image and a reverse 3D image is uncomfortable and distracting for the user.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. A display comprising: a parallax optic having a plurality of parallax elements; a display device having a plurality of pixels arranged as groups, each of which cooperates with the parallax elements of the parallax optic such that corresponding pixels of the groups are viewable in respective different viewing regions; and a control arrangement configured to select arbitrary first and second spatial regions of the display device, the spatial regions each comprising a plurality of topographically connected pixels, and the control unit is configured to simultaneously select, for image display, a first combination of the pixels of each group of the first spatial region and a second combination of the pixels, different from the first combination, of each group of the second spatial region to provide simultaneous first and second display viewing modes of different viewing range characteristics, wherein the display has multiple groups of pixels, each group of pixels being a different subset of the plurality of pixels of the display; and wherein each group comprises a first pixel aligned with a central axis of a cooperating parallax element, second and third pixels each directly adjacent to the first pixel and on opposite sides of the first pixel, and at least one fourth pixel directly adjacent to and on an opposite side of the second or third pixel from the first pixel, wherein the fourth pixel is aligned with an opaque region in the parallax optic adjacent to the cooperating parallax element.

2. A display as claimed in claim 1, in which the control arrangement is capable of selecting at least one further arbitrary region of the display device and of selecting, for image display, at least one further combination of pixels, different from the first and second combinations, of each group of the at least one further region to provide at least one further simultaneous viewing mode of viewing range characteristics different from those of the first and second modes.

3. A display as claimed in claim 2, in which the at least one further region comprises a single third region.

4. A display as claimed in claim 2, in which the at least one further region comprises a plurality of further regions.

5. A display as claimed in claim 1, in which the first mode is a public mode.

6. A display as claimed in claim 1, in which adjacent ones of the viewing regions partially overlap.

7. A display as claimed in claim 1, in which the parallax optic is non-controllable.

8. A display as claimed in claim 1, in which selection of display mode is determined exclusively by pixel selection of each group.

9. A display as claimed in claim 1, in which each of the modes is selected from at least some of: a first private mode whose viewing region includes a display axis; a second private mode whose viewing region is offset from the display axis; a public mode; a first dual view mode whose viewing regions are on either side of the display axis; a second dual view mode whose viewing regions are on one side of the display axis; and an autostereoscopic mode.

10. A display as claimed in claim 9, in which at least one of the modes comprises the autostereoscopic mode and the display comprises an image generator for generating a three dimensional image of a user-operable control device for display by the display device and an input device for detecting a user operation, the image generator being arranged, in response to detection by the input device of the user operation, to change the perceived depth position of the control device image.

11. A display as claimed in claim 10, in which the control device is a control button.

12. A display as claimed in claim 11, in which the image generator is arranged to change the perceived depth plane of an upper surface of the control button image in response to detection by the input device.

13. A display as claimed in claim 10, in which the input device comprises one of a mouse, a touchscreen, a gesture recognition device and a proximity detector.

14. A display as claimed in claim 1, in which each parallax element provides two dimensional parallax.

15. A display as claimed in claim 1 in which each parallax element provides one dimensional parallax.

16. A display as claimed in claim 1, in which the at least one fourth pixel is shared with an adjacent group.

17. A display comprising:
a parallax optic having a plurality of parallax elements; a display device having a plurality of pixels arranged as groups, each of which cooperates with the parallax elements of the parallax optic such that corresponding pixels of the groups are viewable in respective different viewing regions; and a control arrangement configured to select arbitrary first and second spatial regions of the display device, the spatial regions each comprising a plurality of topographically connected pixels, and the control unit is configured to simultaneously select, for image display, a first combination of the pixels of each group of the first spatial region and a second combination of the pixels, different from the first combination, of each group of the second spatial region to provide simultaneous first and second display viewing modes of different viewing range characteristics,
wherein the display has multiple groups of pixels, each group of pixels being a different subset of the plurality of pixels of the display; and
in which each group comprises first and second pixels, disposed directly adjacent to each other and on opposite sides of a plane containing a centre line of the cooperating parallax element and extending substantially perpendicularly to the parallax optic, and third pixels disposed directly adjacent to and on opposite sides of the first and second pixels from the plane,
wherein the third pixels each are aligned with respective opaque regions in the parallax optic adjacent to the cooperating parallax element.

18. A display as claimed in claim 17, in which at least one of the third pixels is shared with an adjacent group.

19. A display comprising:
a parallax optic having a plurality of parallax elements; a display device having a plurality of pixels arranged as groups, each of which cooperates with the parallax elements of the parallax optic such that corresponding pixels of the groups are viewable in respective different viewing regions; and a control arrangement configured to select arbitrary first and second spatial regions of the display device, the spatial regions each comprising a plurality of topographically connected pixels, and the control unit is configured to simultaneously select, for image display, a first combination of the pixels of each group of the first spatial region and a second combination of the pixels, different from the first combination, of each group of the second spatial region to provide simultaneous first and second display viewing modes of different viewing range characteristics,
wherein the display has multiple groups of pixels, each group of pixels being a different subset of the plurality of pixels of the display; and
in which each group comprises first and second pixels, disposed directly adjacent to each other and on opposite sides of a plane containing a centre line of the cooperating parallax element and extending substantially perpendicularly to the parallax optic, and third and fourth pixels disposed directly adjacent to and on opposite sides of the first and second pixels, respectively, from the plane, wherein the third and fourth pixels are aligned with a boundary between an opaque region in the parallax optic and the cooperating parallax element.

20. A display as claimed claim 1, in which the pixels of each group are of a same colour.

21. A display as claimed in claim 1, in which the parallax optic comprises a one dimensional array of parallax elements.

22. A display as claimed in claim 1, in which the parallax optic comprises a two dimensional array of parallax elements.

23. A display as claimed in claim 1, in which the parallax optic comprises a lens array.

24. A display as claimed in claim 1, in which the parallax optic comprises a parallax barrier.

25. A display as claimed in claim 24, in which each parallax element comprises an aperture containing a lens.

26. A display as claimed in claim 1, in which the parallax optic is formed on a substrate of the display device.

27. A display as claimed in claim 1, in which the parallax optic is attached to a substrate of the display device.

28. A display as claimed in claim 1, in which the parallax optic is disposed between outer elements of the display device.

29. A display as claimed in claim 1, in which the display device is one of a transmissive device, a reflective device and a transflective device.

30. A display as claimed in claim 29, in which the display device is a liquid crystal device.

31. A display as claimed in claim 1, in which the display device is an emissive device.

32. A display as claimed in claim 31, in which the display device is one of a light emitting diode device, an organic light emitting diode device, a plasma display device, a field emission device and a cathode ray tube.

33. A display as claimed in claim 1, in which the parallax optic is disposed between the display device and the viewing regions.

34. A display as claimed in claim 1, comprising a manual input arrangement cooperating with the display device to permit manual selection of viewing mode.

35. A display as claimed in claim 34, in which the manual input arrangement comprises a touch screen arrangement.

36. A display comprising a parallax optic and a display device having a plurality of pixels arranged as groups, each of which cooperates with a parallax element of the parallax optic and comprises a first pixel aligned with a central axis of the parallax element, second and third pixels each directly adjacent to the first pixel, and at least one fourth pixel directly adjacent to and on an opposite side of the second or third pixel from the first pixel, wherein the fourth pixel is aligned with an opaque region in the parallax optic adjacent to the parallax element, and wherein each of the first through fourth pixels cooperates with the element of the parallax optic to emit light to a different viewing region from the other pixels.

\* \* \* \* \*